(12) United States Patent
Le et al.

(10) Patent No.: US 9,104,241 B2
(45) Date of Patent: Aug. 11, 2015

(54) PERFORMING MULTIPLE FUNCTIONS BY A MOBILE DEVICE DURING A VIDEO CONFERENCE

(71) Applicant: TangoMe, Inc., Mountain View, CA (US)

(72) Inventors: Quoc Le, San Jose, CA (US); Guy Fighel, Mountain View, CA (US)

(73) Assignee: TangoMe, Inc., Mountain View, CA (US)

( * ) Notice: Subject to any disclaimer, the term of this patent is extended or adjusted under 35 U.S.C. 154(b) by 98 days.

(21) Appl. No.: 13/944,518

(22) Filed: Jul. 17, 2013

(65) Prior Publication Data

US 2015/0022617 A1    Jan. 22, 2015

(51) Int. Cl.
*H04N 7/15* (2006.01)
*G06F 3/01* (2006.01)
*G06F 3/0484* (2013.01)
*H04N 7/14* (2006.01)

(52) U.S. Cl.
CPC ............ *G06F 3/017* (2013.01); *G06F 3/04847* (2013.01); *H04N 7/148* (2013.01); *H04N 7/15* (2013.01)

(58) Field of Classification Search
CPC ........ H04N 7/15; G06F 3/017; G06F 3/04847
USPC ............... 348/14.02, 14.08, 14.01; 379/93.21
See application file for complete search history.

(56) References Cited

U.S. PATENT DOCUMENTS

| | | | |
|---|---|---|---|
| 5,544,300 A | 8/1996 | Skarbo et al. | |
| 5,717,857 A | 2/1998 | Burkman et al. | |
| 5,887,139 A | 3/1999 | Madison, Jr. et al. | |
| 6,243,645 B1 | 6/2001 | Moteki et al. | |
| 7,574,523 B2 | 8/2009 | Traversat et al. | |
| 8,169,462 B2 * | 5/2012 | Ryu | 348/14.02 |
| 8,180,915 B2 | 5/2012 | Zhao | |
| 8,233,025 B2 | 7/2012 | Lee et al. | |
| 8,289,365 B2 | 10/2012 | De Lind Van Wijngaarden et al. | |
| 8,487,975 B2 * | 7/2013 | King et al. | 348/14.02 |
| 8,654,941 B2 * | 2/2014 | Mock et al. | 379/93.21 |
| 8,786,660 B2 * | 7/2014 | Lyu | 348/14.01 |
| 8,988,480 B2 * | 3/2015 | Dave et al. | 348/14.02 |
| 2002/0143855 A1 | 10/2002 | Traversat et al. | |
| 2005/0047390 A1 | 3/2005 | Park et al. | |
| 2006/0242227 A1 | 10/2006 | Rao et al. | |
| 2007/0124308 A1 | 5/2007 | Johnson et al. | |
| 2007/0157303 A1 | 7/2007 | Pankratov | |
| 2007/0171273 A1 | 7/2007 | Saleh et al. | |
| 2007/0280255 A1 | 12/2007 | Tsang et al. | |
| 2008/0115185 A1 | 5/2008 | Qiu et al. | |
| 2008/0215681 A1 | 9/2008 | Darcie et al. | |

(Continued)

OTHER PUBLICATIONS

"PCT/US2014/044699 International Search Report", Oct. 13, 2014, 9 pages.

*Primary Examiner* — Gerald Gauthier

(57) ABSTRACT

A method for enabling multiple functions to be performed by a first mobile device during a video conference within a mobile device environment includes: performing a second function at a first mobile device while a first function is being performed at the first mobile device without interruption of the first function, wherein the first function is a video conference between a first entity associated with the first mobile device and a second entity associated with a second mobile device, and wherein the first function and the second function are different functions.

19 Claims, 15 Drawing Sheets

(56) References Cited

U.S. PATENT DOCUMENTS

| | | |
|---|---|---|
| 2008/0266378 A1 | 10/2008 | Ryu |
| 2009/0006850 A1 | 1/2009 | Birger et al. |
| 2009/0106393 A1 | 4/2009 | Parr et al. |
| 2009/0167633 A1 | 7/2009 | Cohen et al. |
| 2009/0268093 A1 | 10/2009 | Ishihara |
| 2009/0273659 A1 | 11/2009 | Lee et al. |
| 2009/0300673 A1 | 12/2009 | Bachet et al. |
| 2010/0111095 A1 | 5/2010 | Trossell et al. |
| 2010/0245534 A1 | 9/2010 | De Lind Van Wijngaarden et al. |
| 2010/0319020 A1 | 12/2010 | Yuen et al. |
| 2011/0153782 A1 | 6/2011 | Zhao |
| 2013/0155099 A1 | 6/2013 | Ha et al. |
| 2013/0162750 A1 | 6/2013 | Nerst et al. |
| 2014/0320590 A1* | 10/2014 | Laurentino et al. ........ 348/14.08 |
| 2015/0022617 A1* | 1/2015 | Le et al. .................... 348/14.02 |

\* cited by examiner

PROCESS
400

A PORTION OF A COMMUNICATION IS RECEIVED FROM A FIRST USER DEVICE AT A RELAY PEER, WHEREIN THE RELAY PEER IS ONE OF A LIST OF POTENTIAL PEERS AND WHEREIN THE FIRST USER DEVICE AND A SECOND USER DEVICE HAVE DISPARATE CPU POWER AND BANDWIDTH CAPABILITIES
402

THE PORTION OF THE COMMUNICATION IS TRANSCODED TO COMPRISE A BASE LAYER AND AN ENHANCED LAYER
404

THE BASE LAYER OF THE PORTION OF THE COMMUNICATION IS SENT TO THE SECOND USER DEVICE FROM THE RELAY PEER
406

THE ENHANCED LAYER OF THE PORTION OF THE COMMUNICATION IS SELECTIVELY SENT TO THE SECOND USER DEVICE DEPENDING UPON A SET OF CAPABILITIES OF THE SECOND USER DEVICE
408

THE RECEIVING THE PORTION OF THE COMMUNICATION FROM THE FIRST USER DEVICE IS TERMINATED AT THE RELAY PEER DURING THE COMMUNICATION
410

THE PORTION OF THE COMMUNICATION FROM THE FIRST USER DEVICE IS RECEIVED AT A SECOND RELAY PEER
412

THE PORTION OF THE COMMUNICATION IS SENT TO THE SECOND USER FROM THE SECOND RELAY PEER
414

THE BASE LAYER AND THE ENHANCED LAYER ARE SENT TO A THIRD USER DEVICE
416

FIG. 4

PROCESS
1000

DATA ASSOCIATED WITH A CONTACT LIST IS RECEIVED AT A COMPUTER SYSTEM FROM A HANDHELD DEVICE, WHEREIN THE DATA WAS SENT AUTOMATICALLY FROM THE HANDHELD DEVICE WITHOUT REQUIRING ACTIONS FROM A USER
1002

THE DATA ASSOCIATED WITH THE CONTACT LIST IS NORMALIZED USING AN ALGORITHM
1004

THE NORMALIZED DATA IS COMPARED WITH DATA IN A DATABASE
1006

CONTACT MATCHES ARE ESTABLISHED BETWEEN THE DATA ASSOCIATED WITH THE CONTACT LIST AND CONTACTS IN THE DATABASE
1008

THE MATCHES ARE REPORTED TO THE HANDHELD DEVICE
1010

FIG. 10

PROCESS
1100

A TRACKER PEER IS CONTACTED AND OBTAINING A LIST OF PEER NODES AT A USER DEVICE
1102

A SUBSET OF PEER NODES ARE SELECTED FROM THE LIST OF PEER NODES TO ACT AS RELAY NODES FOR A COMMUNICATION
1104

A FIRST FORM OF COMMUNICATION IS TRANSMITTED TO AT LEAST ONE RELAY NODE FOR THE AT LEAST ONE RELAY NODE TO FORWARD TO AT LEAST ONE OTHER USER DEVICE, WHEREIN THE RELAY NODE IS ONE OF THE SUBSET OF THE PEER NODES
1106

THE FIRST FORM OF COMMUNICATION IS RECEIVED AT THE USER DEVICE FROM THE AT LEAST ONE RELAY NODE FORWARDED FROM THE AT LEAST ONE OTHER USER
1108

A SECOND FORM OF COMMUNICATION IS TRANSMITTED TO THE AT LEAST ONE RELAY NODE FOR THE AT LEAST ONE RELAY NODE TO FORWARD TO THE AT LEAST ONE OTHER USER DEVICE, WHEREIN THE RELAY NODE IS ONE OF THE SUBSET OF THE PEER NODES
1110

FIG. 11

PERFORMS A SECOND FUNCTION AT A FIRST MOBILE DEVCIE WHILE A FIRST FUNCTION IS BEING PERFORMED AT THE FIRST MOBILE DEVICE WITHOUT INTERRUPTION OF THE FIRST FUNCTION, WHEREIN THE FIRST FUNCTION IS A VIDEO CONFERENCE BETWEEN A FIRST ENTITY ASSOCIATED WITH THE FIRST MOBILE DEVICE AND A SECOND ENTITY ASSOCIATED WITH A SECOND MOBILE DEVICE, AND WHEREIN THE FIRST FUNCTION AND THE SECOND FUNCTION ARE DIFFERENT FUNCTIONS
1402

DISPLAYS AN OBJECT ON A DISPLAY SCREEN OF THE FIRST MOBILE DEVICE, WHERIEN THE OBJECT REPRESENTS THE SECOND ENTITY
1404

RECEIVING A MODIFICATION GESTURE; AND
IN RESPONSE TO THE RECEIVING THE MODIFICATION GESTURE, MODIFIES A SIZE OF AN IMAGE DISPLAYED ON THE DISPLAY SCREEN FROM A FIRST SIZE TO A SECOND SIZE, WHEREIN SUBSEQUENT TO THE MODIFYING, THE OBJECT COMPRISES THE IMAGE AT THE SECOND SIZE
1406

RECEIVES OBJECT MOVEMENT INSTRUCTIONS; AND
IN RESPONSE TO THE OBJECT MOVEMENT INSTRUCTIONS, MOVES THE OBJECT FROM A FIRST POSITION ON THE DISPLAY SCREEN TO A SECOND POSITION ON THE DISPLAY SCREEN
1308

FIG. 14

PERFORMING MULTIPLE FUNCTIONS BY A MOBILE DEVICE DURING A VIDEO CONFERENCE

BACKGROUND

Modern technology provides for a variety of communication means and methods. For example, there are many types of communications including voice calls, video calls, text messages, photo messages, etc. Additionally, communication may be one-to-one or multi-party communications. Typically multi-party communications are accomplished by a plurality of devices communicating with a central infrastructure. For example, a central infrastructure may be a central computer server or a group of computer servers maintained in a server farm. A central infrastructure may be expensive to establish, maintain and operate.

Many advances have been made in mobile handheld technology. Specifically smart phones have increasingly more features. There is an increased demand to develop the functionality of the smart phones and their components. For example, some smart phones now have two cameras, one mounted on the front and one on the back. Additionally, smart phones may have more than one method of connecting to a network to transmit data. These features can be used to provide a more comprehensive communication experience.

Advances have also been made with respect to video conferencing between mobile devices. For example, Google Hangout™ enables people to share photos and have real-life conversations. However, when switching from one function to another function, such as video conferencing to an audio call or texting, the video picture of the video conference will disappear to account for the second function (e.g., the audio call). In another example Cisco WebX™ enables online meeting experiences by incorporating audio, video and real-time content sharing. Thus, Cisco WebX™ allows for a group of people to switch between at least two modalities (e.g., audio, video, etc.). However, these functions and modalities are not available to non-participants to the online meeting. Thus, many limitations exist with regard to performing multiple functions while video conferencing.

BRIEF DESCRIPTION OF THE DRAWINGS

FIG. 4 illustrates a flowchart of an example method for communicating in a peer-to-peer computer environment in accordance with embodiments of the present technology.

FIG. 10 illustrates a flowchart of an example method for automatic contact filtering in accordance with embodiments of the present technology.

FIG. 11 illustrates a flowchart of an example method for communicating in accordance with embodiments of the present technology.

FIG. 14 illustrates a flowchart of an example method for performing multiple functions by a first mobile device during a video conference within a mobile device environment in accordance with embodiments of the present technology.

Figure 1:
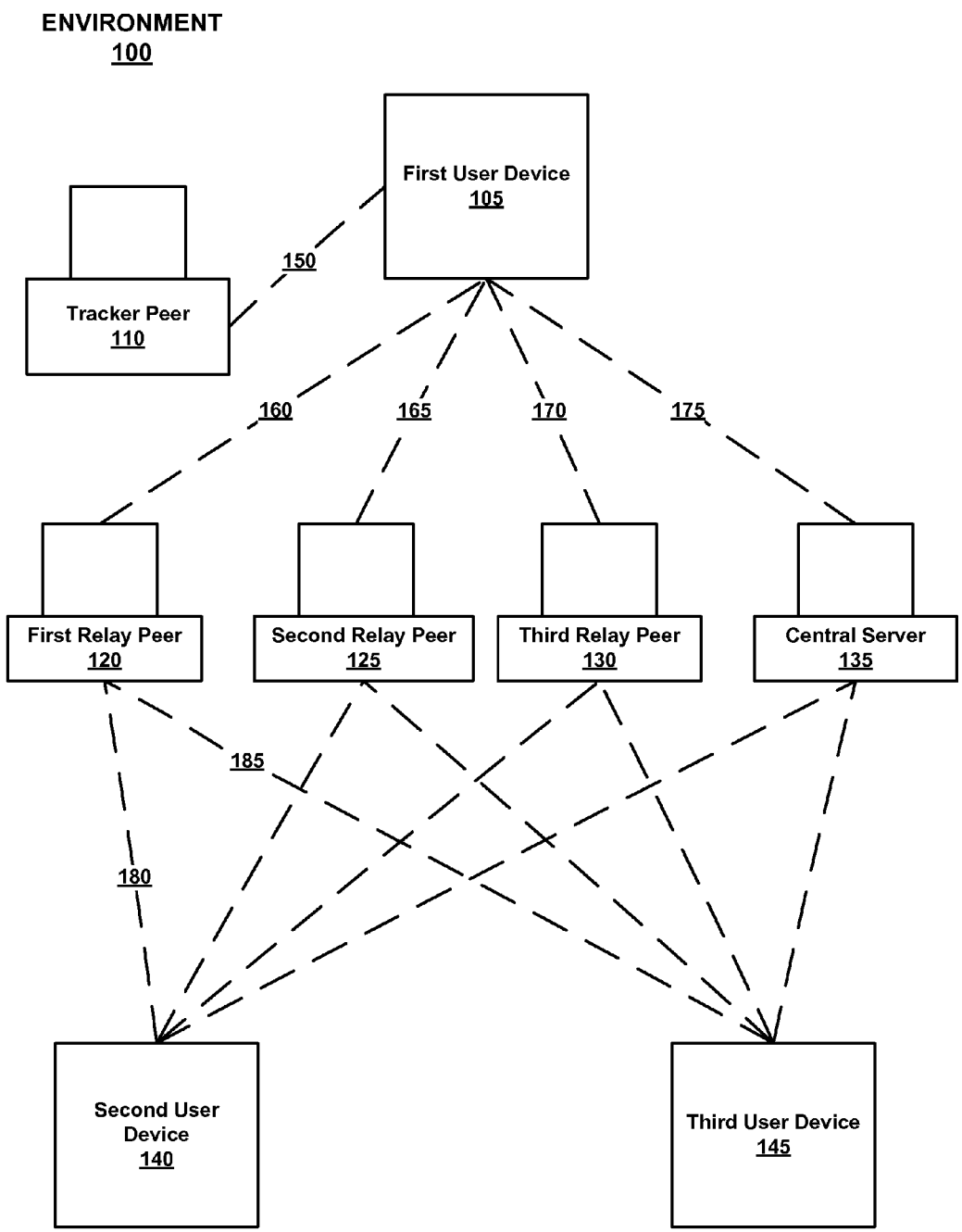
FIG. 1 illustrates a block diagram of an example environment for communicating in a peer-to-peer computer environment in accordance with embodiments of the present technology.

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "contacting", "selecting", "employing", "receiving", "providing", "sending", "terminating", "transmitting", "communicating", "transcoding", "displaying", "enabling", "initiating", "normalizing", "establishing", "reporting", "performing", "accessing", "taking", "sending", "receiving", "modifying", "converting", "moving", or the like, refer to the actions and processes of a computer system, or similar electronic computing device. The computer system or similar electronic computing device, such as a telephone, smartphone, or handheld mobile device, manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview of Communicating in a Computer Environment

Embodiments of the present technology are for communicating in a computer environment. A single user may be capable of communicating one-to-one with another user via user devices using no relays. However, such a connection without a relay may not be possible or may be poor quality, unreliable and lack effective scalability to extend a call to a multiparty call.

Embodiments of the present technology allow a user to communicate to at least one other user via user devices associated with a peer-to-peer computer environment. In one embodiment, a user obtains a list of potential relay peers from a tracker peer. The user device then selects at least one relay peer based on the availability and capabilities of the relay peers. An optimization scheme may be employed to make such a selection. A user device may employ one or several relay peers to communicate with a second user device.

In one embodiment, pluralities of relay peers are employed to transmit the communication to a second user device. The user device may divide the communication into portions and each portion is sent via a different relay peer. For example, the audio portion of a communication is divided from the video portion of the communication and sent over different relay peers. In one embodiment, the communication is relayed using a first relay peer and then switches to a second relay peer seamlessly during the communication.

In one embodiment, the relay peers each receive a portion of the communication and replicate the portion. The replicated portions may be sent to a plurality of user devices each being employed by a user. Thus, scalability is achieved and a multi-party communication may be achieved without loss of quality or reliability. Additionally, operations traditionally performed by central servers and infrastructure may be performed by the idle computers of end users.

In one embodiment, the user devices that are communicating have disparate capabilities. For example, the first user device may be a personal computer with a high speed Internet connection and the second user device may be a smart phone connected to a mobile network. In one embodiment, a relay peer may transcode the communication so that the communication comprises a base layer and an enhanced layer. The base layer may be sent to devices with lower capabilities and the base layer with the enhanced layer may be sent to the devices with higher capabilities.

A communication as used in the present disclosure may refer to several types of communications, including but not limited to, real-time audio and/or video communication, text messages, photo messages, video messages, error correction codes etc. wherein the communication and messages are sent and received via electronic communication devices. User devices may be, but are not limited to, telephones, computer systems, netbooks, notebooks, televisions, hand held devices, mobile devices, smart phones, cellular phones, personal digital assistants, connected televisions, etc. In the present disclosure the terms relay peer(s) or storage peer(s) refer to electronic devices that are nodes or peers in a peer-to-peer computer environment. The term tracker peer may refer to either a peer in a peer-to-peer computer environment or a server computer system.

It should be appreciated that a peer-to-peer computer environment is well known in the art and is also known as a peer-to-peer network and is often abbreviated as P2P. It should be understood that a peer-to-peer computer environment may comprise multiple computer systems, and may include routers and switches, of varying types that communicate with each other using designated protocols. In one embodiment, a peer-to-peer computer environment is a distributed network architecture that is composed of participants that make a portion of their resources (such as processing power, disk storage, and network bandwidth) available directly to their peers without intermediary network hosts or servers. Participants may be known as nodes or peers. In one embodiment, peer-to-peer technology is used to manage a cluster of nodes.

Embodiments of the present technology further enable a mobile device to participate in a video conference with one or more other mobile devices, while also performing additional functions on the mobile device, without interruption of the video conference (or any of the other functions). For example, a user "A" of a mobile device "A" may be participating in a video conference with a user "B" of a mobile device "B". Embodiments enable the user "A" to also check his text messaging, while still maintaining the video as well as the audio of the video conference with user "B".

In various embodiments, the user "A" may reduce the size of the images appearing on the mobile device's display screen; the user "A" may make the image of user "B" smaller, while user "A" and user "B" are having a video conference, such that user "A" is able to make room for viewing his text messaging concurrent with participating in the video conference. For example, user "A" and user "B" are participating in a video conference. User "B"'s image is displayed on the display screen of user "A"'s mobile device; the entire area of the display screen of user "A"' mobile device is used to show user "B"'s image. Similarly, user "A"'s image is displayed on the display screen of user "B"'s mobile device; the entire area of the display screen of user "B"'s mobile device is used to show user "A"'s image. User "A" wishes to view his text messages on his mobile device. In order to both continue participating in the video conference and also view his text messages, user "A", in one embodiment, uses a pinching action (i.e., using at least two fingers [or inputs] spaced apart from each other and drawing them together toward each other) on the image of user "B" that appears on the display screen of user "A"'s touch screen mobile device. This pinching action has the effect of reducing the image's size to that of a predetermined size and shape. For example, in one embodiment, after user "A" performs the pinching action on the display screen showing the image of user "B", the image of user "B" becomes a small circle, and is placed (either automatically or by user "A") in the upper right hand corner of the display screen of mobile device "A". The text messaging function is now presented as occupying the full area of the display screen. The smaller image of user "B" participating in the video conference is overlaid on the larger image of user "A"'s text messaging function that is filling the display screen of user "A"' mobile device.

Likewise, if user "A" also wishes to view a movie during his video conference with user "B", while also concurrently viewing his text messages, user "A" may once again use the pinching action to reduce the image of the text messaging window and reposition the resulting widget. By resizing the images of user "B" and the text messaging window, the movie may be seen on the area of the display screen which is left for viewing. In another embodiment, user "A" may wish to play a video game with user "C", while also participating in a video conference with user "B". User "A" may use the pinching action to resize the image of user "B" and to leave more area on the display screen for user "A" to interact user "C" via a video game.

As will be discussed herein, embodiments enable the performance of multiple functions by a mobile device while that mobile device is participating in a video conference, without interrupting the video conference during the performance of other functions. The images displayed on the mobile device's display screen may be resized such that more room is left on the display screen for viewing other functions. The images may be resized into any predetermined shape, such as circle, square, rectangle, etc. The shapes of the resized images may be moved from one position on the display screen to another position. Embodiments use these resized images to aid in simultaneously representing different real-time functions on a single display screen, without interrupting the video conferencing function.

The following discussion will demonstrate various hardware, software, and firmware components that are used with and in computer systems for communicating in a peer-to-peer computer environment and for performing multiple functions by a mobile device during a video conference using various embodiments of the present technology. Furthermore, the systems and methods may include some, all, or none of the hardware, software, and firmware components discussed below.

Embodiments of Communicating in a Computer Environment

With reference now to FIG. 1, a block diagram of an environment 100 for communicating in a peer-to-peer computer environment. Environment 100 includes first user device 105, tracker peer 110, first relay peer 120, second relay peer 125, third relay peer 130, central server 135, second user device 140, third user device 145, connection line 150, and communication lines 160, 165, 170, 175, 180, and 185. Environment 100 comprises components that may or may not be used with different embodiments of the present technology and should not be construed to limit the present technology.

In one embodiment, environment 100 comprises a peer-to-peer computer environment that includes, but is not limited to, first user device 105, tracker peer 110, first relay peer 120, second relay peer 125, third relay peer 130, central server 135, second user device 140, and third user device 145. In one embodiment, each of the components is able to connect with and communicate with any other device or peer in the peer-to-peer computer environment. In one embodiment, every device or peer is not able to connect with or communicate with every other device or peer, but is at least able to connect with and communicate with one other device or peer.

In one embodiment, first user device 105 is an electronic device used for communicating in a peer-to-peer computer environment. First user device 105 may be a computer system, a netbook, a notebook, a hand held device, a mobile device, a smart phone, a cellular phone, a personal digital assistant, etc. First user device 105 must have some type of connectivity to a network such as Ethernet, WiFi, WiMax, a cellular network, 3G etc. In one embodiment, first user device 105 is required to install an application for purposes of the present technology. In one embodiment, first user device 105 is not required to install any additional application and instead may practice the present technology using technology already installed on first user device 105. For example, first user device 105 may use a web browser application to practice the present technology. In one embodiment, second user device 140 and third user device 145 comprise the same features as first user device 105.

In one embodiment, the peer-to-peer computer environment comprises a tracker peer computer system such as tracker peer 110. The purpose of tracker peer 110 is to receive a request from a user device such as first user device 105. In one embodiment, tracker peer 110 provides potential relay peers to first user device 105. For example, tracker peer 110 may provide data identifying first relay peer 120, second relay peer 125, and third relay peer 130 as peers or nodes associated with the peer-to-peer computer environment. Tracker peer 110 may be combined with other components of environment 100 to provide data to users. Tracker peer 110 also has the ability to be updated by the peer-to-peer computer environment with data regarding potential peers and central servers. In one embodiment, the peer-to-peer computer environment comprises more than one tracker peer. In one embodiment, tracker peer 110 may also operate as a relay peer or as a central server.

In one embodiment, first user device 105 identifies potential peers associated with the peer-to-peer computer environment using the list of potential peers obtained from tracker peer 110. First user device 105 then contacts each of the potential peers and assesses the potential peers' availability and capabilities. In one embodiment, an optimization scheme is employed to select relay peers from the list of potential peers.

First user device 105 may make a determination, based on user requirements, as to which potential peers may be utilized as relays peers. Such a determination may be made using an algorithm based optimization schemed factors related to the capabilities and availability of the potential peers. The capabilities of the potential peer may include the potential peer's available downlink throughput and uplink throughput as well as processing power and speed. It should be appreciated that the factors for the optimization scheme may include, but are not limited to an estimated geographical length of a path taken by a communication through the peer-to-peer computer environment, the number of hops taken by a communication through the peer-to-peer computer environment, the round trip time of a communication through the peer-to-peer computer environment, the compatibility of a network address translator (NAT) or firewall between a relay peer and the user devices, amount of available resource of the relay peer, the historic reliability of the relay peer, and the length of time the relay peer has been running the protocol.

In one embodiment, a peer may provide first user device with data identifying potential relays. First user device 105 may then contact the potential relay peers identified by the peer that were not identified by tracker peer 110 to determine if such potential relay peers may be utilized by first user device 105 as a relay peer for communications. This process may be repeated with a subset or with all of the potential relay peers identified by the peers that were not identified by tracker peer 110. In this manner first user device 105 may increase the number of potential peers that may be utilized as relay peers. In one embodiment, a list of potential relay peers is stored on user device 105 between sessions and is used to avoid having to contact tracker peer 110 for a new list every session. In one embodiment, the process of identifying additional potential relay peers is performed during idle times when first user device 105 is not performing a communication.

In one embodiment, first user device 105 may determine that first relay peer 120 may be utilized as a relay peer for communication. First relay peer 120 may be a computer system or other device associated with the peer-to-peer computer environment. In one embodiment, first relay peer 120 receives a communication from first user device 105 over communication line 160 and relays the communication to second user device 140 over communication line 180 in a one-to-one communication. In one embodiment, first relay peer 120 may receive a communication from first user device 105 and replicate the communication. The replicated communication may also be used to send the communication to both second user device 140 and third user device 145 in a multi-party communication. Thus replicating and relaying a communication to both second user device 140 and third user device 145 comprise relaying or sending a communication to a plurality of devices. It should be appreciated that a relay may require verification from a user device for each action it takes. In other words, a relay peer may require a communication sent to a relay peer from a user device to be signed by an encryption key. The encryption key is then verified using a second key. Such a step may take place each time data is received at a relay peer.

First user device 105 may send information regarding the presence status of a user to a relay peer. This information may in turn be relayed to the contacts of a user. The information may also be updated each time a user changes status.

In one embodiment, first relay peer 120 receives only a portion of a communication, second relay peer 125 receives a different portion of the communication, and third relay peer 130 receives yet a different portion of the communication from first user device 105. First relay peer 120, second relay peer 125, and third relay peer 130 then send or relay their respective portions of the communication to second user device 140. Thus a communication is relayed using a plurality of relay peers. It should be appreciated that a communication may be relayed using any number of peers and is not limited to first relay peer 120, second relay peer 125, and third relay peer 130 of FIG. 1. Additionally, first relay peer 120, second relay peer 125, and third relay peer 130 may each replicate their respective portions of the communication. In one embodiment, the replicated portions are sent to third user device 145 and the original portions are sent to second user device 140 for a multi-party communication.

In one embodiment, a communication may be divided such that one portion is audio and one portion is video. An audio or video portion may also be divided into multiple portions to be sent over multiple relay peers. For example, a communication may be divided such that the audio is divided into three portions where one portion is considered the base portion and is given priority or protection over the other portions. The two other audio portions provide additional details to the base portion such that if only the base portion is relayed to second user device 140, the audio communication will be accomplished, but each additional portion that is relayed to second user device 140 will increase the quality of the audio communication. Additionally, an audio portion may be given priority or protection over a video portion. A video portion divided into to sub-portions may similarly provide a low-resolution portion and a hi-resolution portion.

In one embodiment, the communication also includes error correcting codes. For example, forward error correction (FEC) may be employed to protect the communication data stream in the event where at least of the relay peers used for the communication is terminated. Such a termination may occur to an error, the relay peer being disconnected from the network, the relay peer being shut down, or other reasons. In one embodiment, layered coding is used to in combination with multiple path transmission for the communication. Thus, different levels of communication may be sent to different devices with different capabilities.

In one embodiment, the relay peer has the ability to transcode the communication stream before it relay the communication stream to another user device. In one embodiment, the transcoding comprises separating the communication stream into a base layer and an enhanced layer. The relay peer may send only the base layer or the base layer and the enhanced layer to a user device. In one embodiment, the relay peer has the ability to selectively determine which layers to send to which user devices based on the capabilities of the user devices. In one embodiment, the base layer comprises enough data for both a video and audio transmission at a lower resolution or data rate than the original communication. In one embodiment, the base layer comprises only audio and no video. In one embodiment, the enhanced layer is used in conjunction with the base layer at an end user device to recreate the original communication. For example, a multi-way call may include three devices two personal computers and one smart phone. In such an example, the relay peer may send the base layer and the enhanced layers to the personal computers and only the base layer to the smart phone. Thus, the relay peer may act as an effective relay for at least two heterogeneous devices that have disparate resources and capabilities.

In one embodiment, the transmitting user device may select an appropriate compression scheme for the communication. It should be appreciated that such compression scheme for digital media are well known in the art. A communication stream may comprise a combination of text, audio, video, and error correction code.

It should be appreciated that the described relay processes performed by first relay peer 120, second relay peer 125, and third relay peer 130 may be reversed where the relay peers are receiving communications or portions of communications from second user device 140 or third user device 145 and then relayed to other user devices such as first user device 105. Therefore a given relay peer in the peer-to-peer computer environment may receive a communication from a first user device then relay the communication to a second user device and also receive a communication from the second user device and relay it to the first user device. Thus a multi-party communication may include two-way communications for each user device involved. Additionally, the number of user devices in a multi-party call is not limited to first user device 105, second user device 140 and third user device 145, but may be performed using any number of user devices.

In one embodiment, relay peers may be added or removed during the communication. For example, a communication may begin utilizing two relay peers and subsequently removes a relay peer. This may be useful if second user device 140 is receiving an audio portion over first relay peer 120 and a video portion over second relay peer 120 and the video portion is terminated during the communication. Then second relay peer 125 may be removed from relaying or sending the communication. Another example may be a communication using both first relay peer 120 and second relay peer 125 to communicate to both second user device 140 and third user device 145 in a multi-party communication. In this example, if either second user device 140 or third user device 145 terminates the communication, the other user devices may continue the communication using only first relay peer 120. Conversely, more relay peers may be added to a communication as additional portions of communication are added or additional user devices are added to a multi-party communication during a communication. Adding a relay peer to replace a failed relay peer may be considered a failover relay. Thus the ability to add relay peers to a communication in progress provides scalability and reliability to a communication sent over a peer-to-peer computer environment.

In one embodiment, a relay peer sending or relaying a given portion of a communication may terminate the relaying during a communication and a second relay peer may be selected to continue relaying the remaining portion of the communication. Thus reliability for the communication is maintained during the regular churn of a peer-to-peer computer environment as peers join and leave the peer-to-peer computer environment.

In one embodiment, a relay peer may receive feedback from a user device that is receiving a communication from the relay peer. The feedback may comprise information such as the quality of the call or an amount of the communication not being received at the receiving user device. This feedback may be relayed to the sending user device. First user device 105 may decide to change relays or the number of relay peers may be adjusted based on the feedback. For example, first user device 105 may utilize first relay peer 120 and second relay peer 125 to relay a communication divided into two portions to second user device 140. In this example first relay peer 120 may receive feedback from second user device 140 that the communication quality is below a threshold. At this point in the communication, first user device 105 divides the remainder of the communication into three portions and sends the three portions over first relay peer 120, second relay peer 125, and third relay peer 130 respectively. Thus third relay peer 130 was added to increase the diversity of paths used for communicating or the redundancy in the data relayed across the peer-to-peer computer environment in an attempt to increase the quality of the communication. Any number of relay peers may be added or removed in this manner during a communication.

Additionally, user device may adjust a parameter of the communication based on a feedback received from another user device via a relay peer. In one embodiment, adjusting a parameter may be adjusting an encoding rate of the communication. In one embodiment, adjusting a parameter may be adjusting a resolution communication.
In one embodiment, adjusting a parameter may be changing a codec used for the communication. In one embodiment, adjusting a parameter may be changing the error protection scheme of the communication.

In one embodiment, first user device 105 may communicate with second user device 140 in a one-to-one communication. For such a one-to-one communication, the present technology may be employed with or without relay peers. If a relay peer is not used, there must be compatibility of NATs and firewalls between the user devices. A protocol such as Interactive Connectivity Establishment (ICE), Traversal Using Relay NAT (TURN) or Session Traversal Utilities for NAT (STUN) may be used to accomplish a one-to-one communication without a relay peer. Layered coding and unequal error protection for the different layers is used to ensure sufficient protection for the lower layers in case of data loss. Encoding rates may also be increased or reduced during a communication.

In one embodiment, environment 100 includes central server 135. Central server 135 represents a server computer system or a group of server computer systems such as a server farm. In one embodiment, central server 135 is not employed. In one embodiment, central server 135 is utilized as a back-up system for tracker peer 110, storage peer 115, first relay peer 120, second relay peer 125, and/or third relay peer 130. Thus central server 135 may perform any of the tasks functions or services of tracker peer 110, first relay peer 120, second relay peer 125, and/or third relay peer 130. Therefore if one of the components of the peer-to-peer computer environment fails to perform its task, service or operation, central server 135 may be utilized as a failover to perform the task, service or operation. Central server 135 provides an additional layer of reliability in a peer-to-peer computer environment where peers and nodes join and leave the environment due to regular churn. In one embodiment, central server 135 is utilized as a component of routine operations in the course of a communication.

Operations of Communicating in Computer Environment

Figure 2:
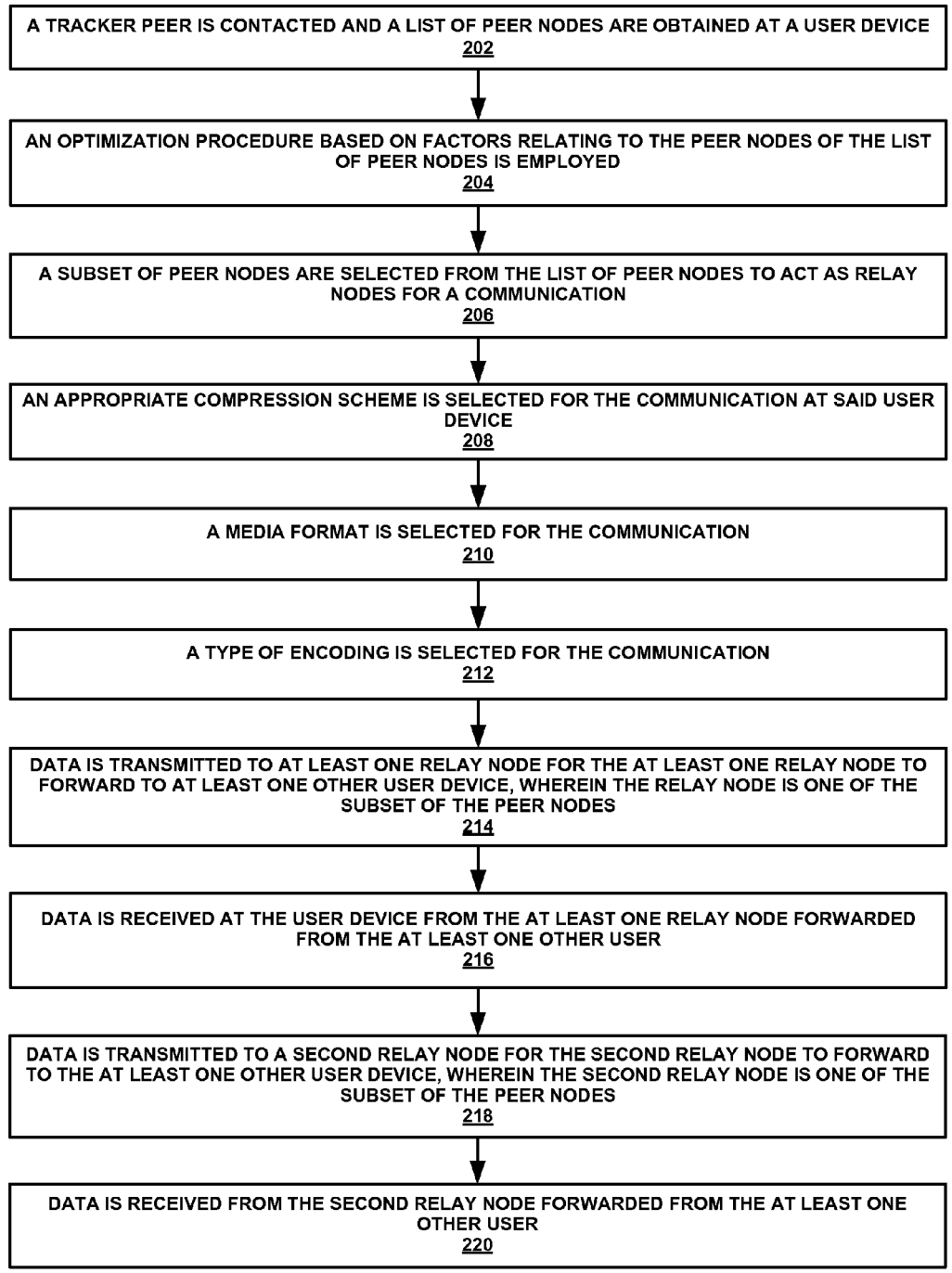
FIG. 2 illustrates a flowchart of an example method for communicating in a peer-to-peer computer environment in accordance with embodiments of the present technology.

FIG. 2 is a flowchart illustrating process 200 for communicating in a peer-to-peer computer environment, in accordance with one embodiment of the present invention. In one embodiment, process 200 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 200 is performed by tracker peer 110, and first relay 120 of FIG. 1. In one embodiment, the methods may reside in a computer usable storage medium having instructions embodied therein that when executed cause a computer system to perform the method.

At 202, a tracker peer is contacted and a list of peer nodes are obtained at a user device. In one embodiment, the user device may be first user device 105 and the tracker peer may be tracker peer 110 of FIG. 1. In one embodiment, the tracker peer may be a central server.

At 204, an optimization procedure based on factors relating to the peer nodes of the list of peer nodes is employed. The optimization procedure may include an algorithm and use factors related to the capabilities and resources, such as CPU and bandwidth, of the relay peers as described above in reference to FIG. 1.

At 206, a subset of peer nodes are selected from the list of peer nodes to act as relay nodes for a communication. At 208, an appropriate compression scheme is selected for the communication at the user device.

At 210, a media format is selected for the communication. The media formats used may be those well known in the art for digital communications comprising speech, audio, video, images, text, error correction code and other digital media. For example h.264 video format may be employed, speex for audio and parity codes for error correction.

At 212, a type of encoding is selected for the communication. Encoding and decoding procedures and protocols may those that are well known in the art or may be based on unique algorithms. At 214, employing error correcting code. In one embodiment, the error correction code is Forward Error Correction (FEC).

At 214, data is transmitted to at least one relay node for the at least one relay node to forward to at least one other user device, wherein the relay node is one of the subset of the peer nodes. In one embodiment, the at least one relay node and the user devices may be the user devices and relay peers described in FIG. 1.

At 216, data is received at the user device from the at least one relay node forwarded from the at least one other user.

At 218, data is transmitted to a second relay node for the second relay node to forward to the at least one other user device, wherein the second relay node is one of the subset of the peer nodes. In such a step, the first relay node may have been terminated either at the request of the user device or at the request of the relay peer at which point the second relay peer acts as a failover.

At 220, data is received from the second relay node forwarded from the at least one other user.

FIG. 4 is a flowchart illustrating process 400 for communicating in a peer-to-peer computer environment, in accordance with one embodiment of the present invention. In one embodiment, process 400 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 200 is performed by tracker peer 110, and first relay 120 of FIG. 1. In one embodiment, the methods may reside in a computer usable storage medium having instructions embodied therein that when executed cause a computer system to perform the method.

At 402, a portion of a communication is received from a first user device at a relay peer, wherein the relay peer is one of a list of potential peers and wherein the first user device and a second user device have disparate CPU power and bandwidth capabilities.

At 404, the portion of the communication is transcoded to comprise a base layer and an enhanced layer. In one embodiment, transcoding encompasses changing the resolution of the communication.

At 406, the base layer of the portion of the communication is sent to the second user device from the relay peer.

At 408, the enhanced layer of the portion of the communication is selectively sent to the second user device depending upon a set of capabilities of the second user device.

At 410, the receiving the portion of the communication from the first user device is terminated at the relay peer during the communication.

At 412, the portion of the communication from the first user device is received at a second relay peer.

At 414, the portion of the communication is sent to the second user from the second relay peer.

At 416, the base layer and the enhanced layer are sent to a third user device.

It should be appreciated that processes 200 and 400 need not carry out each of the described steps to complete its operation. Nor do the steps need to be carried out in the order described. For example, this process may be for a live communication scenario where the steps take place continuously for portion after portion of the communication. In another example, in the case of video communication: one picture is encoded and transmitted by a first user device then it is separated into two layers by a relay peer. The relay peer transmits the base layer to a second user device and the base and enhancement layers to a third user device. This all takes place in no particular order. During this time the first user device is already encoding the next picture and so on.

Example Computer System Environment

Figure 3:
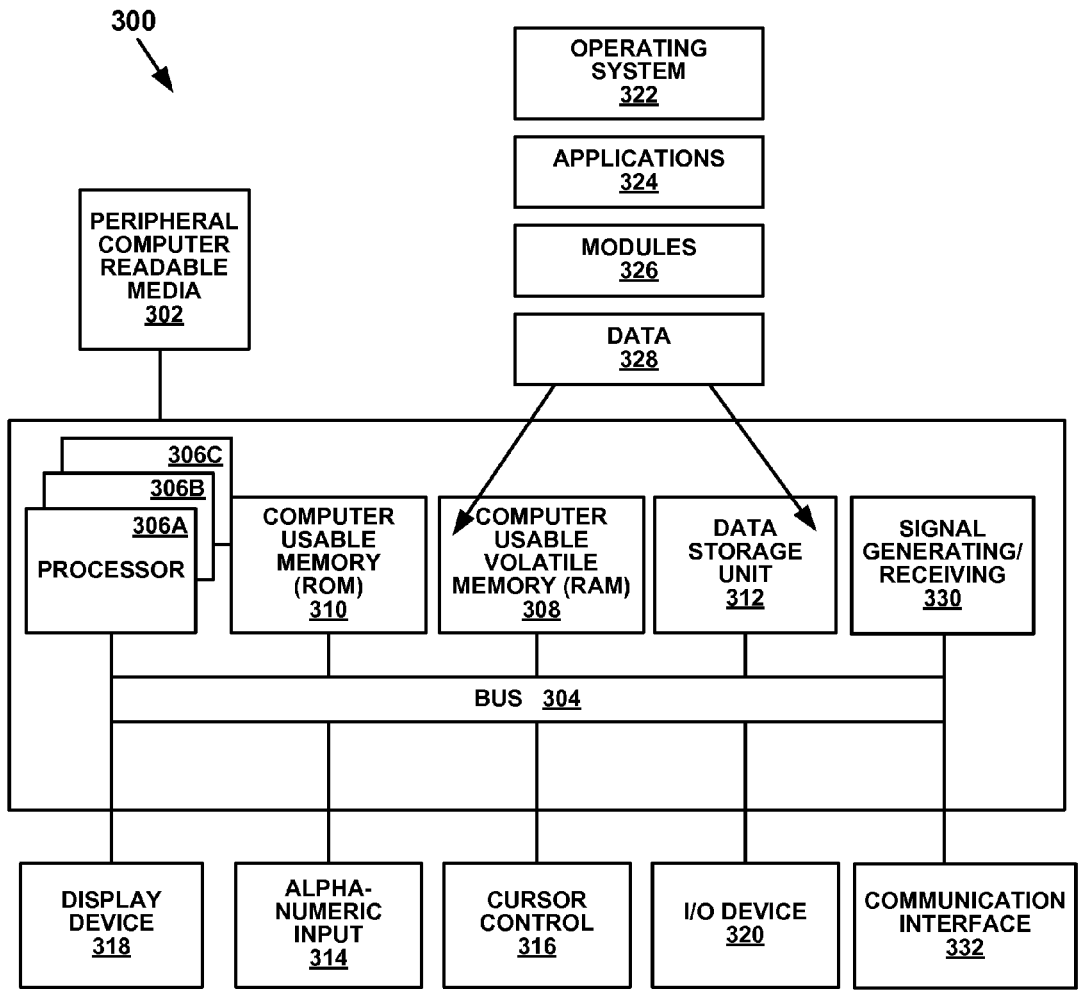
FIG. 3 illustrates a diagram of an example computer system upon which embodiments of the present technology may be implemented.

With reference now to FIG. 3, portions of the technology for providing a communication composed of computer-readable and computer-executable instructions that reside, for example, in computer-usable media of a computer system. That is, FIG. 3 illustrates one example of a type of computer that can be used to implement embodiments of the present technology.

FIG. 3 illustrates an example computer system 300 used in accordance with embodiments of the present technology. It is appreciated that system 300 of FIG. 3 is an example only and that the present technology can operate on or within a number of different computer systems including general purpose networked computer systems, embedded computer systems, routers, switches, server devices, user devices, various intermediate devices/artifacts, stand alone computer systems, mobile phones, personal data assistants, televisions and the like. As shown in FIG. 3, computer system 300 of FIG. 3 is well adapted to having peripheral computer readable media 302 such as, for example, a floppy disk, a compact disc, and the like coupled thereto.

System 300 of FIG. 3 includes an address/data bus 304 for communicating information, and a processor 306A coupled to bus 304 for processing information and instructions. As depicted in FIG. 3, system 300 is also well suited to a multi-processor environment in which a plurality of processors 306A, 306B, and 306C are present. Conversely, system 300 is also well suited to having a single processor such as, for example, processor 306A. Processors 306A, 306B, and 306C may be any of various types of microprocessors. System 300 also includes data storage features such as a computer usable volatile memory 308, e.g. random access memory (RAM), coupled to bus 304 for storing information and instructions for processors 306A, 306B, and 306C.

System 300 also includes computer usable non-volatile memory 310, e.g. read only memory (ROM), coupled to bus 304 for storing static information and instructions for processors 306A, 306B, and 306C. Also present in system 300 is a data storage unit 312 (e.g., a magnetic or optical disk and disk drive) coupled to bus 304 for storing information and instructions. System 300 also includes an optional alpha-numeric input device 314 including alphanumeric and function keys coupled to bus 304 for communicating information and command selections to processor 306A or processors 306A, 306B, and 306C. System 300 also includes an optional cursor control device 316 coupled to bus 304 for communicating user input information and command selections to processor 306A or processors 306A, 306B, and 306C. System 300 of the present embodiment also includes an optional display device 318 coupled to bus 304 for displaying information.

Referring still to FIG. 3, optional display device 318 of FIG. 3 may be a liquid crystal device, cathode ray tube, plasma display device or other display device suitable for creating graphic images and alpha-numeric characters recognizable to a user. Optional cursor control device 316 allows the computer user to dynamically signal the movement of a visible symbol (cursor) on a display screen of display device 318. Many implementations of cursor control device 316 are known in the art including a trackball, mouse, touch pad, joystick or special keys on alpha-numeric input device 314 capable of signaling movement of a given direction or manner of displacement. Alternatively, it will be appreciated that a cursor can be directed and/or activated via input from alpha-numeric input device 314 using special keys and key sequence commands.

System 300 is also well suited to having a cursor directed by other means such as, for example, voice commands. System 300 also includes an I/O device 320 for coupling system 300 with external entities. For example, in one embodiment, I/O device 320 is a modem for enabling wired or wireless communications between system 300 and an external network such as, but not limited to, the Internet. A more detailed discussion of the present technology is found below.

Referring still to FIG. 3, various other components are depicted for system 300. Specifically, when present, an operating system 322, applications 324, modules 326, and data 328 are shown as typically residing in one or some combination of computer usable volatile memory 308, e.g. random access memory (RAM), and data storage unit 312. However, it is appreciated that in some embodiments, operating system 322 may be stored in other locations such as on a network or on a flash drive; and that further, operating system 322 may be accessed from a remote location via, for example, a coupling to the internet. In one embodiment, the present technology, for example, is stored as an application 324 or module 326 in memory locations within RAM 308 and memory areas within data storage unit 312. The present technology may be applied to one or more elements of described system 300. For example, a method of modifying user interface 225A of device 115A may be applied to operating system 322, applications 324, modules 326, and/or data 328.

System 300 also includes one or more signal generating and receiving device(s) 330 coupled with bus 304 for enabling system 300 to interface with other electronic devices and computer systems. Signal generating and receiving device(s) 330 of the present embodiment may include wired serial adaptors, modems, and network adaptors, wireless modems, and wireless network adaptors, and other such communication technology. The signal generating and receiving device(s) 330 may work in conjunction with one or more communication interface(s) 332 for coupling information to and/or from system 300. Communication interface 332 may include a serial port, parallel port, Universal Serial Bus (USB), Ethernet port, antenna, or other input/output interface. Communication interface 332 may physically, electrically, optically, or wirelessly (e.g. via radio frequency) couple system 300 with another device, such as a cellular telephone, radio, or computer system.

The computing system 300 is only one example of a suitable computing environment and is not intended to suggest any limitation as to the scope of use or functionality of the present technology. Neither should the computing environment 300 be interpreted as having any dependency or requirement relating to any one or combination of components illustrated in the example computing system 300.

Embodiments of the present technology may be described in the general context of computer-executable instructions, such as program modules, being executed by a computer. Generally, program modules include routines, programs, objects, components, data structures, etc., that perform particular tasks or implement particular abstract data types. Embodiments of the present technology may also be practiced in distributed computing environments where tasks are performed by remote processing devices that are linked through a communications network. In a distributed computing environment, program modules may be located in both local and remote computer-storage media including memory-storage devices.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Overview of Communicating with a User Device

Embodiments of the present technology are for use with a user device. Modern technology provides a variety of mobile handheld devices. Smart phones, for example, may have more than one camera and more than one method of connecting to a network. Additionally the bandwidth and display capabilities of such devices are increasing.

Many users of computer systems have the ability to easily send real-time audio and video communication streams using their computer systems over a network. Such activities may be considered video messaging, video conferencing or the like. Embodiments of the present technology are for sending and receiving multiple communication streams using a handheld device over a network. Embodiments of the present technology may comprise both the use of handheld technology manipulating communication streams and the use of peer-to-peer computer environments for communicating.

Such communications streams may include video, audio, text and error correction code. Embodiments of the present technology allow a user to easily add or remove communications streams to an existing communication stream. For example, a user may employ a handheld device to communicate with a second handheld device operated by a second user. The initial communication may start with only an audio communication stream. However, either user may initiate a second form of communication, e.g. a video stream, enabling each user to view the other user without ending the audio communication stream.

Embodiments of the present technology allow for flexibility in adding and removing communication streams to an existing communication. During an audio communication, a video communication may be initiated and terminated several times while maintaining an uninterrupted audio communication stream. Additionally, only one video stream may be sent so that a first user may view a second user without the second user viewing the first. Additionally, an audio stream may be terminated while maintaining a video communication.

Embodiments of the present technology allow for representations of communication streams to be processed as "objects" seen in real-time but are smaller than the original stream of images. More particularly, a communication stream that is being viewed on a display screen of user "A"'s mobile device may be manipulated (via a touch screen or phone commands) to be reduced in size to be smaller than the whole of the display screen. In one example, the result of this resizing is that of a circular widget, the entirety of which may be considered to be an "object". Within this object, a circular widget, the real-time communication stream is viewable.

While the user "A" of the mobile device "A" is participating in the video conference with user "B", and the image that has been resized to be a small rectangular object on the display screen of mobile device "A" is that of user "B", user "A" may also participate in another function. This other function may be participation in another video conference with a user "C" of a mobile device "C", participation in video gaming with user "D" of a mobile device "D", text messaging with user "E" of a mobile device "E", and functions that don't involve secondary parties, such as watching movies on the display screen of device "A", etc. In other words, user "A" may engage in one or more functions while participating in a video conference with user "B" of the mobile device "B", without interruption and/or disruption of the video conference or any other functions.

In embodiments, the objects are similar in theory to what look like chatheads. The objects represent current functions running on the mobile device "A", a larger view of which is accessible at any time. The objects may be repositioned throughout the display screen. Embodiments enable the user "A" the ability to use and participate in various functions simultaneously while using a mobile device "A" with limited area on the display screen for displaying such functions Further, the objects provide a reminder to user "A" that the functions are ongoing. Embodiments also enable an uninterrupted use of various functions while also participating in a video conference. For example, the video screen remains viewable during which time the user "A" participates in other ongoing functions on mobile device "A".

Embodiments of the present technology also allow for flexibility in selecting which camera to use for a video communication stream. For example, a communication may begin with an audio stream and a video stream where the video is captured from a camera located on the front of a handheld device. During the communication the video stream may be seamlessly swapped to video that is captured from a camera located on the back of a handheld device without disrupting the audio stream. Additionally, a first user may send two video streams to a second user comprising video from both the front camera and back camera of the handheld device.

Embodiments of the present technology also allow for a seamless transition between networks. For example a user may employ a smart phone to initiate a communication with a second smart phone using a wireless card in the first smart phone. The user may then move out of range to effectively use the wireless card during the communication. At that point the smart phone may switch to a cellular network to seamlessly continue the communication. In one embodiment, the communication may change the level of resolution or level of quality to communicate more or less data depending on the difference in capabilities between the two networks.

In one embodiment, a handheld device may display a video stream that is being transmitted and simultaneously display a second video display that is being received from another handheld device. In one embodiment, the hand held device has the ability to swap the position of the two video streams being displayed on the handheld device.

In one embodiment, a handheld device is able to initiate a communication with a second handheld device by initiating contact with a data center. After the initial contact with the data center, in one embodiment, the two handheld devices are able to communicate with each other without requiring the use of the data center or another central server, but rather send and receive the communication over a network.

In one embodiment, a handheld device may provide seamless contact matching. Most smart phones employ a contact list or address book. Upon executing an application for the present technology on a smart phone, the smart phone may seamlessly filter the contacts in the contact list of smart phone to match the smart phone with other smart phones which also have installed an application for the present technology in an automatic fashion requiring no intervention from a user. Such a technique may require the use of a data center or server computer system.

These techniques may all be used in combination to allow an endless variety of initiating and terminating communication streams all during the course of one communication.

Embodiments of Communicating with a User Device

Figure 5:
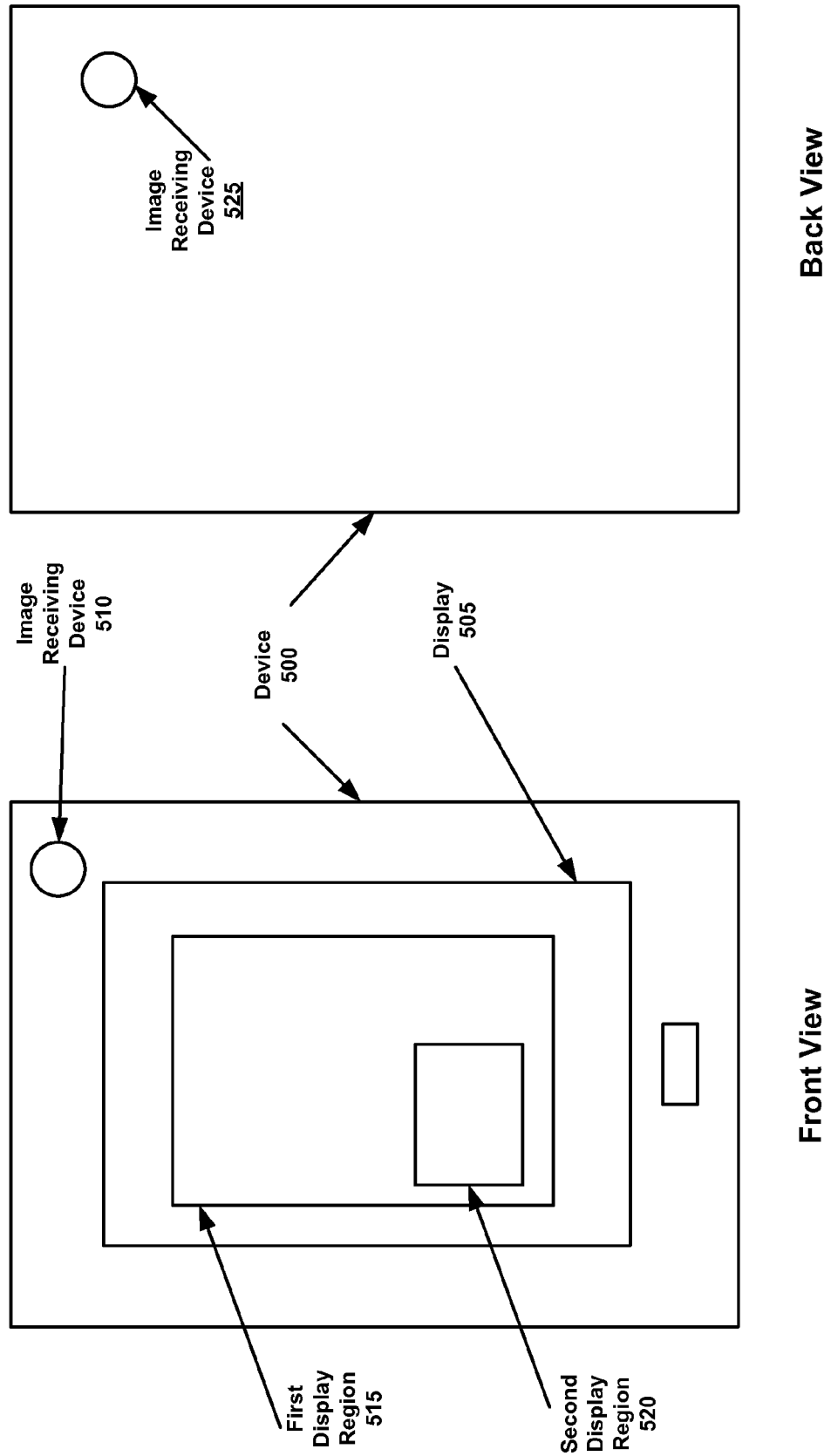
FIG. 5 illustrates a block diagram of an example user device in accordance with embodiments of the present technology.

With reference now to FIG. 5, a block diagram of a front and back view of device 500 used for communicating with a user device. Device 500 includes display 505, image receiving device 510, first display region 515, second display region 520 and image receiving device 525. Device 500 comprises components that may or may not be used with different embodiments of the present technology and should not be construed to limit the present technology.

In one embodiment, device 500 also comprises at least one means for connecting to a network. It should be appreciated that device 500 is a user device that may be, but is not limited to, a smart phone, a pda, a handheld computer, a cell phone, an iPhone®, or a smart phone with the Android® operating system by Google®.

In one embodiment, device 500 has two cameras, image receiving device 510 on the front of device 500 such that images of a user may be captured while a user is viewing display 505 and image receiving device 525 on the back of device 500. It should be appreciated that an image receiving device may be a digital camera capable of capturing either still images or video.

In one embodiment, display 505 is integrated with device 500 and is capable of displaying digital data including text, images and video. Device 500 may be a liquid crystal display or an equivalent type display. In one embodiment, display 505 is also a touch screen that is able to receive input data from a user and to display regions that allow a user to input different data into the device. In one embodiment, display 505 has a first display region 515 and a second display region 520 used for displaying video. In one embodiment, video that is being displayed in first display region 515 may be swapped with video being displayed in second display region 520. It should be appreciated that either first display region 515 or second display region 520 may display video that is captured from an image receiving device associated with device 500 or video that is captured from an image receiving device not associated with device 500.

Figure 6:
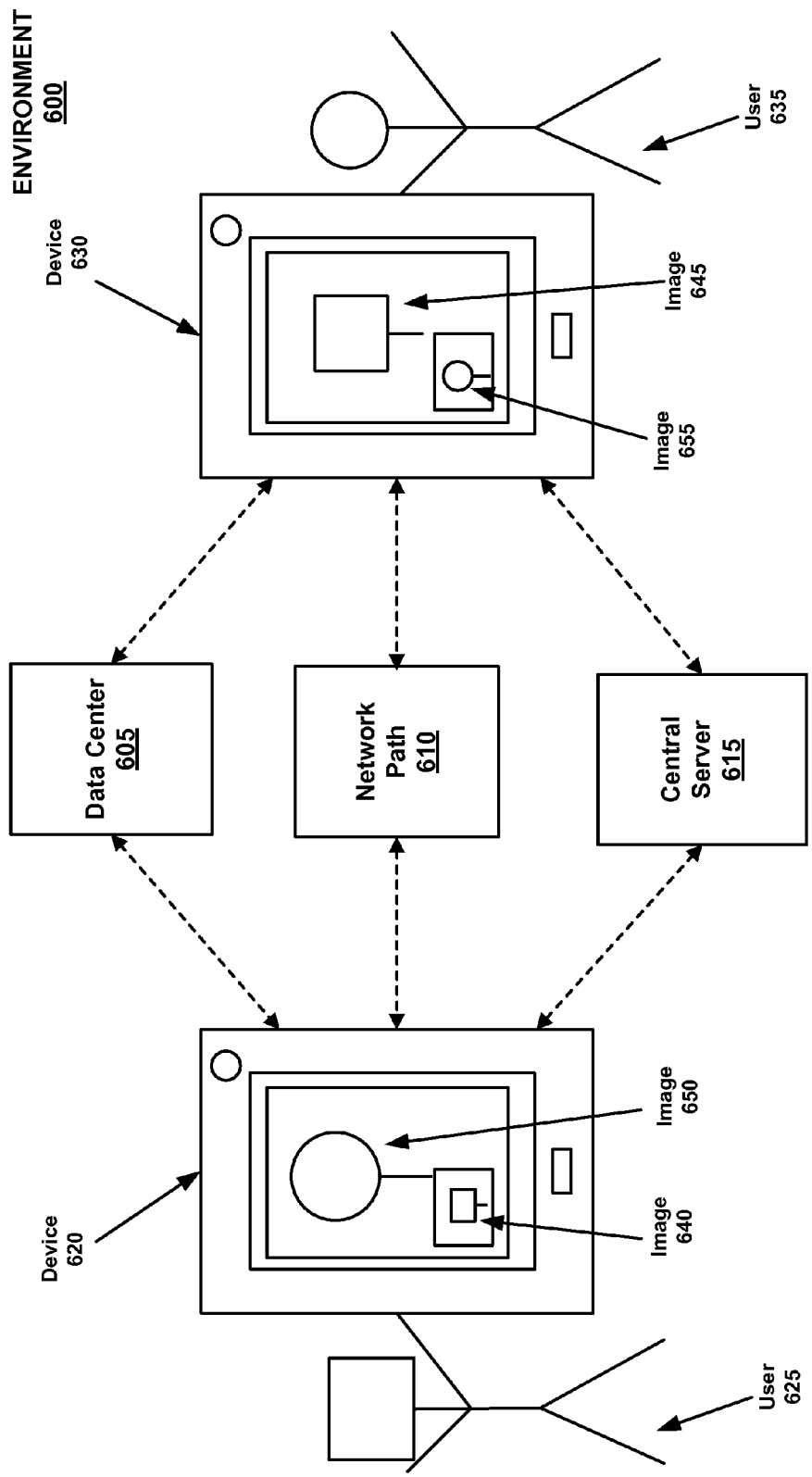
FIG. 6 illustrates a block diagram of an example environment for communicating with a user device in accordance with embodiments of the present technology.

With reference now to FIG. 6, a block diagram of environment 600 used for communicating with a user device. Environment 600 includes data center 605, network path 610, central server 615, device 620, user 625, device 630, user 635, image 640, image 645, image 650, and image 655. Environment 600 comprises components that may or may not be used with different embodiments of the present technology and should not be construed to limit the present technology.

In one embodiment, device 620 and device 630 are the same as device 500 of FIG. 5 have all of the same features and capabilities. In one embodiment, device 620 initiates a communication with device 630 by first contacting data center 605. Data center 605 then contacts device 630 and a communication is started involving at least one communication stream. It should be appreciated that the communication stream may be audio, images, text, pictures or error correction code relating to other communication streams. In one embodiment, after data center 605 initiates the communication between the devices, data center 605 no longer plays any role in the communication. In such a technique, device 620 and device 630 only use data center 605 to initiate the communication and then continue the communication over an established network without requiring the communication to be routed through a particular server. Thus communications can be hosted using very little central infrastructure.

In one embodiment, device 620 and device 630 are unable to use network path 610 for communicating with each other. This may be due to firewalls, which ports are open in a particular network, etc. In one embodiment, device 620 and device 630 may then use central server 615 which is a server computer system designed to relay the communication between the two devices. In one embodiment, central server 615 may be replaced by a peer-to-peer computer network that is described above. In one embodiment, device 620 and device 630 may not require the use of central server 615 for a length of time during a communication and may require the use of central server 615 for a different length of time during the communication. In such an example, the communication may be seamlessly routed between network path 610 and central server 615 without terminating the communication.

FIG. 6 depicts a typical arrangement of two users each using a device to communicate video and audio streams. For example, user 625 uses an image receiving device to capture video of user 625's head. This video is then displayed as image 640 on device 620 and is transmitted to device 630 where it is displayed as image 645. In turn, user 635 uses an image receiving device to capture video of user 635's head. This video is then displayed as image 655 on device 630 and is transmitted to device 620 where it is displayed as image 650. In one embodiment, device 620 is able to swap the position of image 640 and image 650. Such a swap may be performed upon receiving a request from a user. Such a request may be obtained by displaying a region superimposed over image 650. When a user touches the region, then the images will be swapped.

FIG. 6 shows device 620 which displays image 650 as a large image which comprises most of the available display and image 640 as being superimposed over image 640 and obscuring a portion of image 650. Such an arraignment is sometimes known as picture in picture. It should be appreciated that the present technology is not limited to such an arraignment but may instead display the two images such that one is not overlapping or superimposed over the other. The images may be the same size and shape or different from each other.

Figure 7:
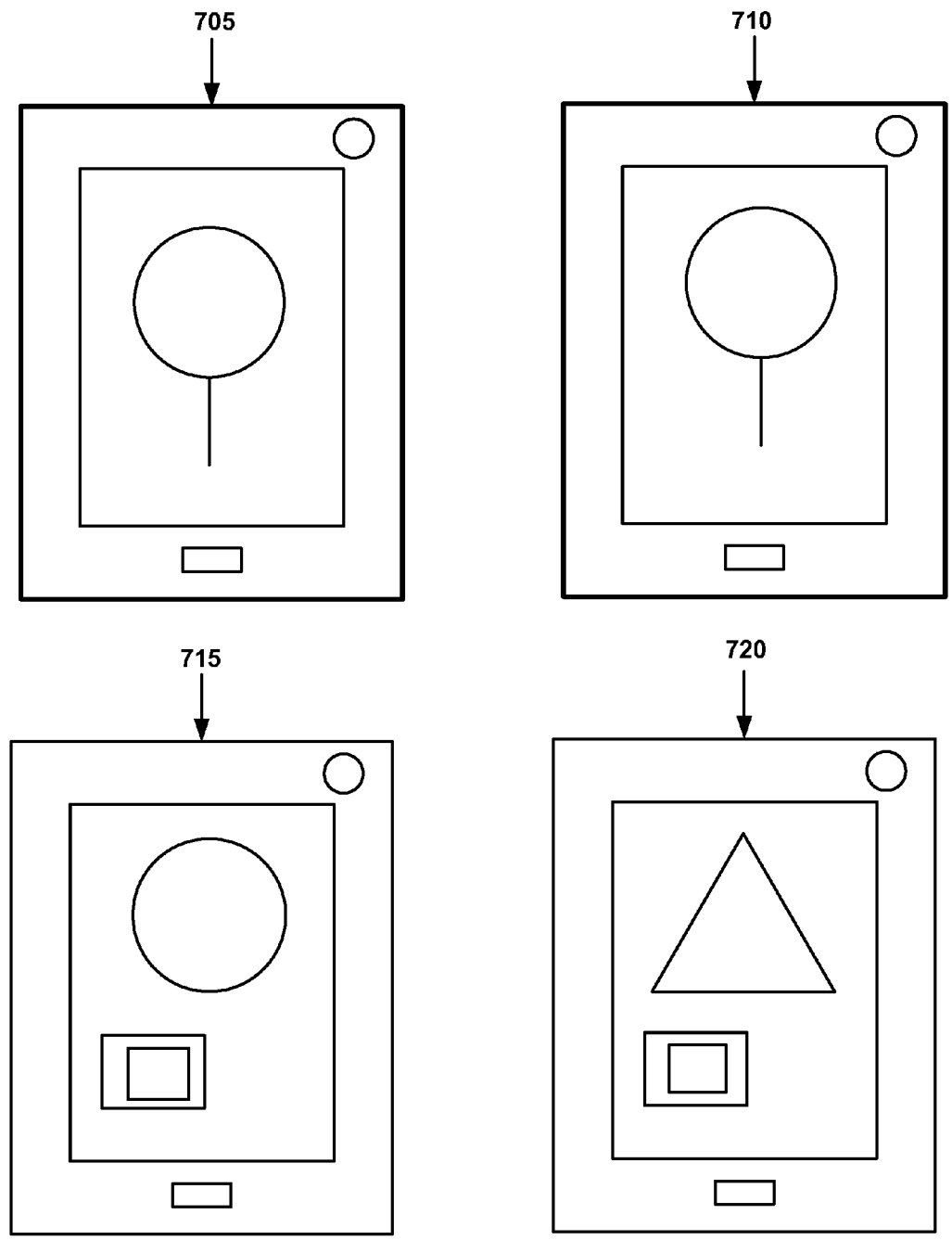
FIG. 7 illustrates a block diagram of example user devices in accordance with embodiments of the present technology.

With reference now to FIG. 7, a series of block diagrams illustrating example devices in accordance with the present technology. The images are examples and should not be construed to limit the present technology.

In one embodiment, device 705 and 710 illustrate an example of a one-way video communication where device 705 captures images or a video, displays the video on device 705, and transmits the video to device 710 and device 710 displays the video. A one-way video communication may also include an audio communication that is either one-way or two ways. Additionally, one-way video may include more than one video stream. For example, device 705 may capture images or video from two distinct image receiving devices and transmit both video streams to device 710. It should be appreciated that a one-way video communication make take place as only a portion of a communication. In other words, during the duration of a communication, portions of the communication may freely switch between two-way video, one-way video, and no video and may or may not include two-way audio.

In one embodiment, device 715 and device 720 illustrate other possible video communications. For example, device 715 may capture two video streams and transmit them to device 720, one video stream of a rectangle and one of a triangle. Device 715 is shown as displaying the rectangle in the smaller display region on the lower left portion of the display, but does not display the video of the triangle. Device 720 displays both video streams which it receives from device 715, one portion of the display shows the triangle and another portion of the display shows the rectangle. Device 720, in turns captures a video stream of a circle which it does not display but transmits to device 715 where it is shown in a large portion of the display associated with device 715. Moreover, devices 715 and 720 may also be communicating using other forms of communication, such as audio or text, simultaneous to the described video communications. Such additional communications may be one-way or two way and may start and stop during the overall communication and may take place simultaneous to a video communication or may take place during a time period in between two video communications.

Therefore it is demonstrated that a communication may employ a plurality of video streams, a plurality of audio streams, and/or a plurality of other communication streams. Additionally, the streams may start or stop periodically throughout the communication and the streams may be one-way or two-way. Additionally a communication is not limited to only two devices but may include more than two devices in a multi-party communication where an endless possibility communication streams may be employed during a single communication.

In one example, a communication may begin with only audio streams. A video stream or streams may then be added. Later the video stream or streams may be terminated while maintaining the audio streams. Video streams may then be added again later.

In one embodiment, a touchscreen may be used as part of a device. Portions of the display on the touchscreen may be display regions designated to receive input from a user using techniques well known in the art of touchscreens. For example, three regions may be employed at the bottom of the display and a fourth region the top right portion of the display that may be used with the touchscreen device to control to manipulate which communications streams are displayed, received and transmitted and also the position of the displayed images. This may include regions which act as buttons to mute or terminate an audio stream or video stream. It should be appreciated that a touchscreen is not required to use the present technology. In one embodiment, hardware buttons are used to manipulate and control the communication streams. Additionally a combination of a touchscreen and hardware buttons may be used.

Figure 12A:
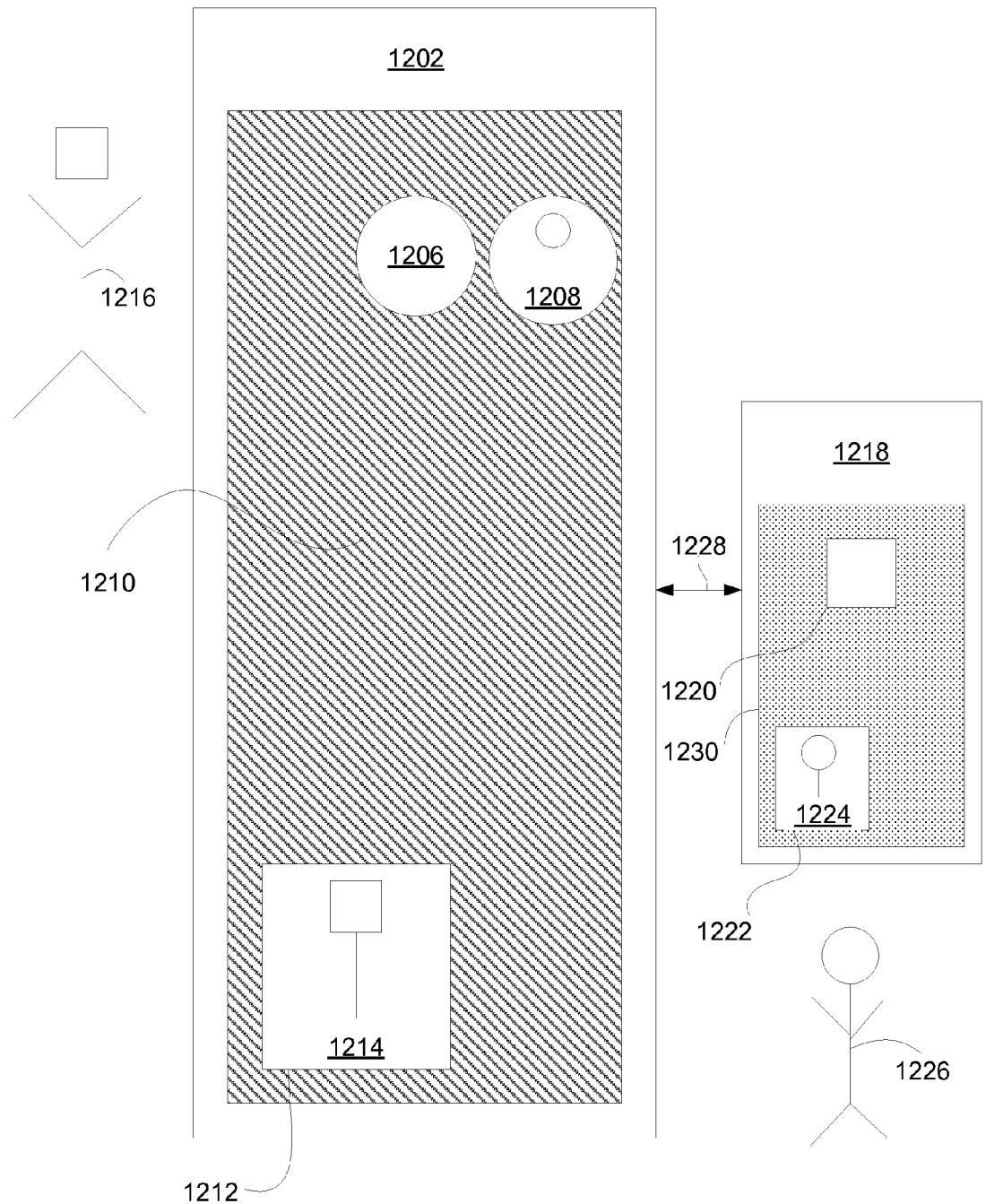
FIG. 12A illustrates a block diagram of an example mobile device in accordance with embodiments of the present technology.
Figure 13:
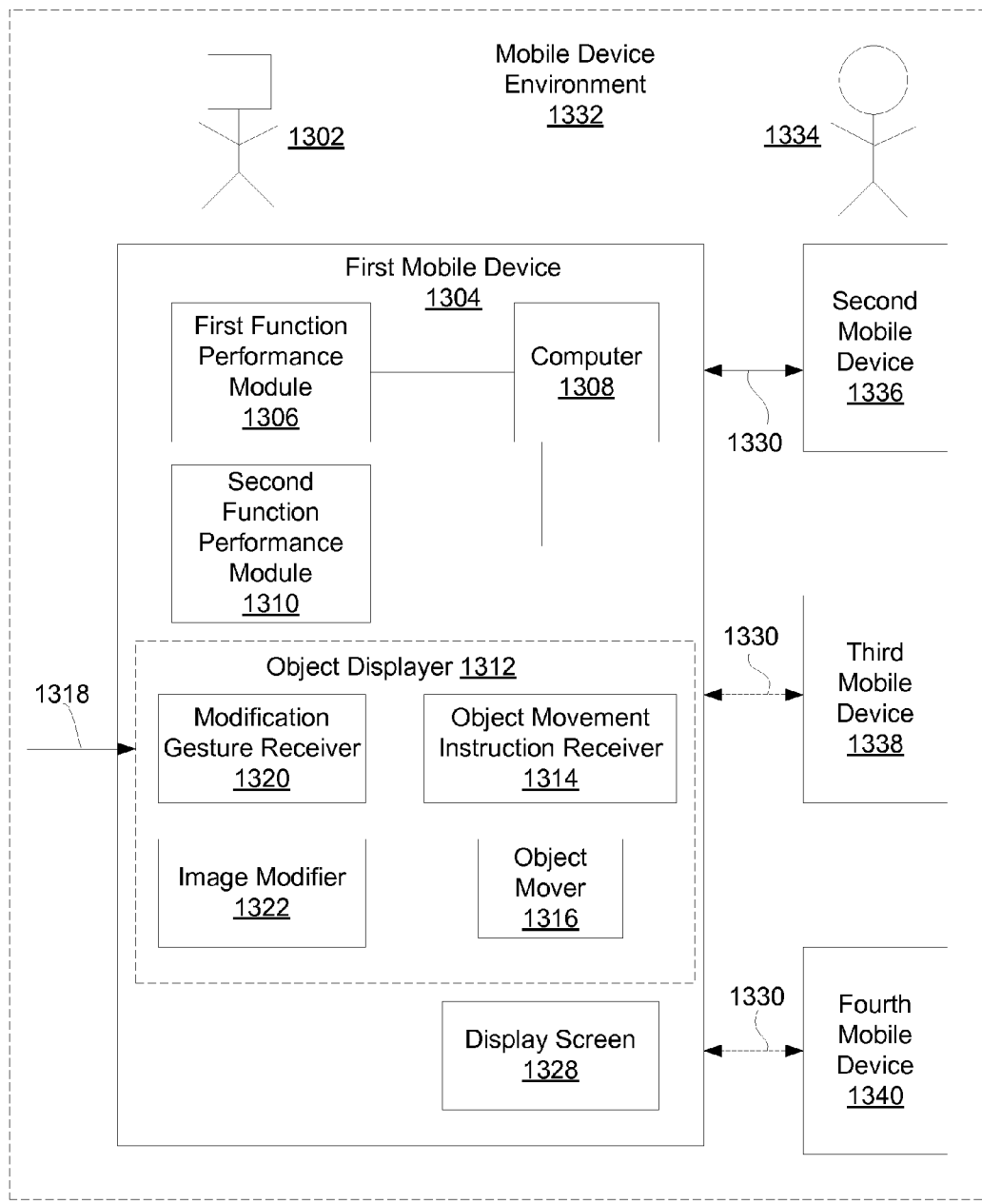
FIG. 13 illustrates a block diagram of an example system in accordance with embodiments of the present technology.

FIG. 12A shows a block diagram of an example mobile device in operation, in accordance with embodiments. FIG. 12A shows the mobile device "A" 1202 and the mobile device "B" 1218 in communication 1228 with each other through a data center, a network path, and/or a central server, as is described with respect to FIG. 6 herein. It should be appreciated that the communication 1228 may also, optionally, be between any number of mobile devices. For example, the communication may be between a third mobile device and a fourth mobile device (as is shown in FIG. 13, discussed below). Mobile device "A" 1202 is being used by entity "A" 1216, and mobile device "B" 1218 is being used by entity "B" 1226.

Mobile device "A" 1202 is shown to have a display screen 1204, upon which images may be displayed. As shown, entity "A" 1216 is currently participating in a video conference with entity "B" 1226. As shown, entity "A" has already resized the entire outer dimensions of the stream of images showing entity "B" to be the size of the object 1208 that is in the upper right-hand corner of the display screen 1204. On note, the object 1208 is still showing entity "B" in real-time, but through a resized image. Further, as can be seen, entity "A" 1216 is also participating in text messaging, as can be seen by the object 1206, also having been reduced in size to the size of the object 1206. Entity "A" is also watching a movie 1210 that is being displayed in real-time (in this instance) on the display screen 1204. Mobile device "A" 1202 is being used by entity "A" 1216.

In accordance with embodiments, the image 1214 of entity "A" 1216 is shown on the display screen 1204 in the window 1212. Likewise, the image 1224 of entity "B" 1226 is shown on the display screen 1230 in the window 1222.

As can be seen in FIG. 12A, the image 1220 of entity "A" is shown to occupy the full area of the display screen 1230 (except for the area of the window 1222). In this instance, the entity "B" 1226 is only using one function, that of the video teleconference with entity "A" 1216.

Figure 12B:
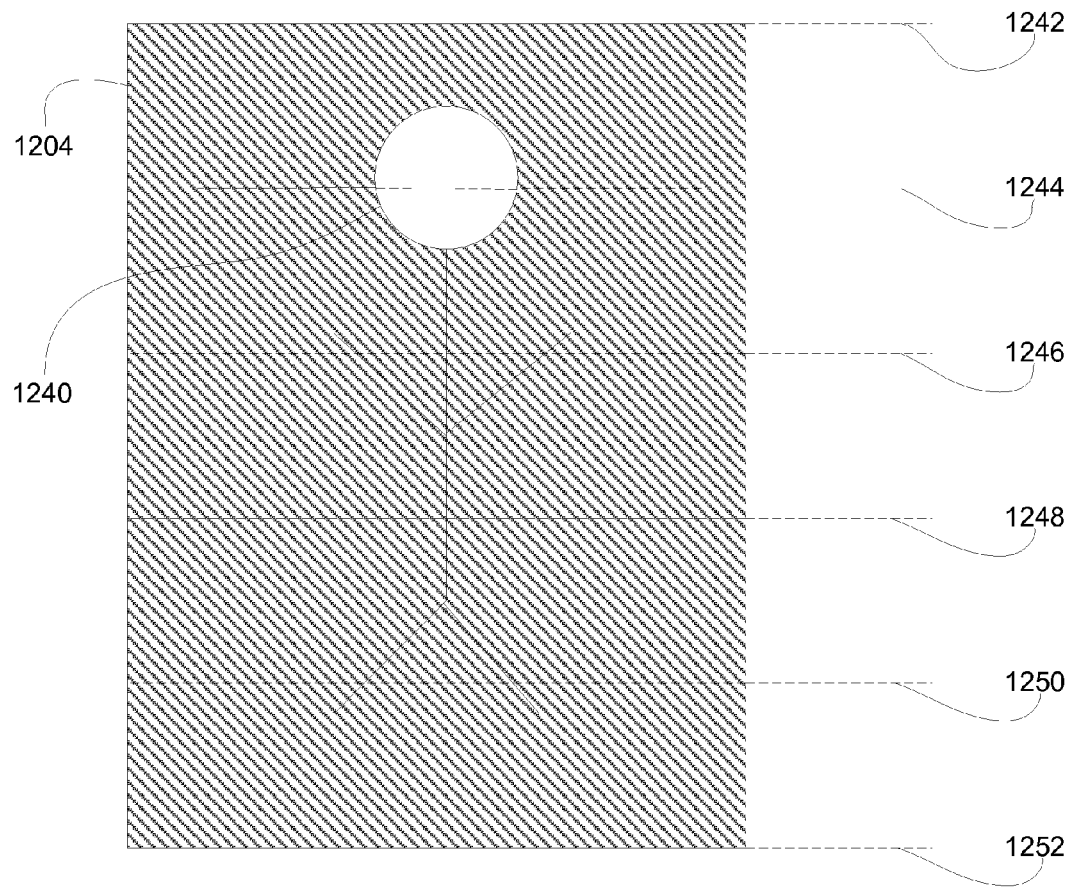
FIG. 12B illustrates an example display screen of a mobile device, in which an image is being resize in accordance with embodiments of the present technology.

FIG. 12B is a block diagram showing the display screen 1204 of FIG. 12A and an operational aspect of the pinching action, in accordance with embodiments. The display screen 1204 shows the image 1240 of entity "B" 1226 occupying the full display screen 1204. If the entity "A" 1226 wishes to reduce the image 1240 of entity "B" 1226 in size in order to make room for watching the image 1210 of a movie, then entity "A" 1216 may perform a modification gesture. The modification gesture may, in one instance, be a pinching action, as will be described with regard to FIG. 12B. A pinching action is performed by using at least two inputs (e.g., fingers, stylus, etc.) that initially are spaced apart, yet touching the display screen 1204, and then are slid towards each other. This inward sliding motion instructs the computer on mobile device "A" 1202 to reduce the image size of the image 1240 of entity "B" 1226. The image 1240 may be reduced in size to a predetermined size, or may be reduced in size according to the extent the inputs are slid toward each other. For example, a slight motion of the two inputs sliding toward each other may reduce the size of the image 1240 of entity "B" 1226 only slightly. While a greater sliding action representing a greater sliding distance by the inputs will reduce the size of the image 1240 of entity "B" 1226 even more. For example, and referring still to FIG. 12B, one input may be placed at location 1242 while a second input may be placed at location 1252. As the first input and the second input are slid toward each other, passing through locations 1244 and 1250, and arriving at locations 1246 and 1248, respectively, the size of the image 1240 of entity "B" is reduced. It should be appreciated that the locations on the display screen 1204 associated with locations 1242, 1244, 1246, 1248, 1250, and 1252 are examples only and do not limit the possible locations at which inputs may be initially placed to perform the pinching action.

FIG. 13 illustrates a block diagram of a system 1300 for enabling multiple functions to be performed by a first mobile device during a video conference within a mobile device environment, in accordance with embodiments. The system 1300 includes a first mobile device 1304 within a mobile device environment 1332. The first mobile device 1304 includes a computer 1308; and coupled with the computer 1308, a first function performance module 1306 and a second function performance module 1310. In one embodiment and as will be described herein, the system 1300 includes, coupled with the computer 1308, an object displayer 1312. The object displayer 1312, in various embodiments, includes: a modification gesture receiver 1320 and an image modifier 1322; and an object movement instruction receiver 1314 and an object mover 1316.

In one embodiment, the first mobile device 1304 is configured for communication via a video conference with at least one other mobile device, such as, for example, a second mobile device 1336, a third mobile device 1338, and a fourth mobile device 1340, as shown in FIG. 13. It should be appreciated that the system 1300 may include any number of mobile devices in communication with the first mobile device 1304.

In one embodiment, the first mobile device 1304 includes a first function performance module 1306 and a second function performance module 1310. The first function performance module 1306 is coupled with the computer 1304. The computer 1304, of note, includes various components, which are discussed herein in relation to FIG. 3. The first function performance module 1306 is configured for performing a first function, wherein the first function includes participation in the video conference between a first entity 1302 associated with the first mobile device 1304 and a second entity 1334 associated with the second mobile device 1336. The first entity 1302 is anyone who is using the first mobile device 1302 for communication. For example, a group of people may be using the first mobile device 1304 to communication via video conference with the second entity 1334, wherein the second entity 1334 may be one or more people. In another example, the first entity 1302 may be a single user communicating via video conference to the second entity 1334, who may be another single user or a group of users. Thus, any user who is participating in the video conference using a particular mobile device is considered to be associated with that mobile device. It should be appreciated that the first mobile device 1304 may be in communication with, via video conference, more than one other mobile device, such as the third mobile device 1338, the fourth mobile device 1340, etc.

In various embodiments, the second function may include the communication and receipt of an accessed stream of data by the first mobile device 1304. For example, a stream of data may be communicated to the first mobile device 1304 from a computer, wherein the computer may be internal to or external of the first mobile device 1304. The stream of data may or may not be in real-time. In another embodiment, and as stated herein, the second function may include a stream of data internal to the first mobile device 1304, such as a saved movie, video, etc. The second function may include any of the following: text messaging; a second video conference with the same or different entities, but within the mobile device environment 1332; emailing; providing music for listening; providing a video for watching; interactive video gaming with one or more people; etc.

In one embodiment, the second function performance module 1310 is coupled with the computer 1308. The second function performance module 1310 is configured for performing a second function at the first mobile device 1304 while the first function is being performed at the first mobile device 1304. The second function is performed without interruption, or disruption, of the first function. The first function and the second function are different functions.

In one embodiment, the first mobile device 1304 includes an object displayer 1312 coupled with the computer 1308. The object displayer 1312 is configured for displaying an object on a display screen 1328 of the first mobile device 1304, wherein the object represents the second entity 1334. For example, during a video conference between the first mobile device 1304 and the second mobile device 1336, the second entity 1334 may appear on the display screen 1328 of the first mobile device 1304 such that the image of the second entity 1334 completely fills the display screen 1328. An object displayer 1312 is responsible for resizing the image filling the display screen 1328 into a smaller image that fits in a smaller area of the display screen 1328. The "object", which is the area on the display screen 1328 that represents the second entity 1334, may be any predetermined shape, size, and/or coloring. In one embodiment, the object displayer 1312 automatically resizes an image that fills the display screen 1328 into a smaller image, based on an event happening. The event happening may be a detection of a request by the first entity 1302 to the first mobile device 1304 to perform a second function, and/or the receipt/request by a third party to communicate with the first entity 1302 via a video conference and/or other forms of communication. It should be appreciated that an event happening may be any event that, should it occur, the object displayer 1312 is preprogrammed to cause the image filling the display screen 1328 to automatically become a second shape and size and contain the same or less content that that contained in the image filling the display screen 1328.

In one embodiment, the object displayer 1312 includes a modification gesture receiver 1320 and an image modifier 1322. The modification gesture receiver 1320 is coupled with the computer 1308. The modification gesture receiver 1320 is configured for receiving a modification gesture. The modification gesture may be any input received by the first mobile device 1304 that causes the first mobile device 1304 to perform a process in which the image that fills the display screen 1328 is at least reduced in size and/or a change in shape. For example, an input may be any, but is not limited to being, the following: a tap on the display screen 1328 of a touchscreen mobile device; a pinching action (as was discussed above); a voice command; and an alphanumeric command entered into the keyboard of the first mobile device 1304.

The image modifier 1322 is coupled with the computer 1308. The image modifier is configured for, in response to receiving the modification gesture, modifying a size of an image displayed on the display screen 1328 from a first size to a second size. Subsequent to the modifying of the size of the image, the object includes the image at the second size. For example, the image modifier 1322 modifies the first size of the image that appears on the display screen 1328 to be that of a second size. In particular, the first size, in one embodiment, of the image that appears on the display screen 1328 is rectangular in shape and has the dimensions of the display screen 1328 itself. The second size, in one embodiment, of the image that appears on the display screen 1328, after modification, is that of a circular image having a diameter of one inch. The size (which includes the shape) of the second size, in one embodiment, is preprogrammed. However, in another embodiment, the dimensions of the second size may be determined on a case by case basis by the first entity 1302 through modification gestures, such as, for example, pinching actions (as discussed with reference to FIG. 12B). It should be appreciated that in one embodiment, the first entity 1302 and/or preprogrammed instructions may change the size of the image to be any size that is different from the size of the image as it appears on the display screen 1328. It should also be appreciated that portions of the image that appears on the display screen 1328 may be used as the representative image. For example, the first entity 1302 may decide to only create an object that represents the image of the second entity 1334 that only includes the face of the second entity 1334. The first entity 1302 may specify which part of the image that fills the display screen 1328 that the first entity 1302 wishes to be represented as an object on the display screen 1328. In another embodiment, facial recognition software is used to recognize the face of the second entity 1334 within the image that fills the display screen 1328, such that the face of the second entity 1334 is that part of the image that is selected to represent the second entity 1334 as the object. It should be appreciated that other kinds of recognition software may be coupled with the computer 1308 and may be used to recognize and select various portions of images on the display screen 1328 to be the representative image displayed as the object (e.g., object 1206, object 1208).

In one embodiment, the object displayer 1312 includes an object movement instruction receiver 1314 and an object mover 1316. The object movement instruction receiver 1314 is coupled with the computer 1308 and is configured for receiving object movement instructions. For example, the first entity 1302 may provide input to the first mobile device 1304, which are translated into instructions for moving the object (e.g., object 1208) to a particular location on the display screen 1328. As described before, the input may be through a stylus or finger touching the display screen 1328. The first mobile device 1304 is preprogrammed to recognize particular input and to translate this input into movement instructions. The object movement instruction receiver 1314 receives these object movement instructions.

In one embodiment, the object mover 1316 is coupled with the computer 1316 and is configured for, in response to the object movement instructions, moving the object from a first position on the display screen 1328 to a second position on the display screen 1328. For example, the object may be moved from a position at the far left upper corner of the display screen 1328 to a position at the far right lower corner of the display screen 1328, according to the object movement instructions received by the object movement instruction receiver 1314. In order to create more space on the display screen 1328, in one embodiment, the objects may be moved at least partially on top of each other, and include an indicator as to which and how many objects are sharing the same space on the display screen 1328. In one embodiment, the objects automatically move on top of each other, in response to a preprogrammed number of functions occurring concurrently. For example, it may be preprogrammed to place the objects on top of each other once seven functions are operating on the display screen 1328. In another embodiment, the first entity 1302 may direct, with one command (e.g., via voice, touchscreen, keyboard), the objects to move on top of each other.

Thus, embodiments enable multiple functions to be operating concurrently and available to the user's mobile device via its display screen. The user of a mobile device with embodiments may continue to view and engage with a first function (video conferencing with a user of another mobile device) while also viewing and engaging with a second function (e.g., viewing email, watching a movie). Embodiments enable the switching between a first and second function to occur on the same display screen, without either the first or second function disappearing in order for the user of the first mobile device to access either one of the functions. Additionally, since embodiments enable the resizing of images on the display screen to be representative images occurring as objects, more functions may occur within a limited display area.

Operations of Communicating with a User Device

Figure 8:
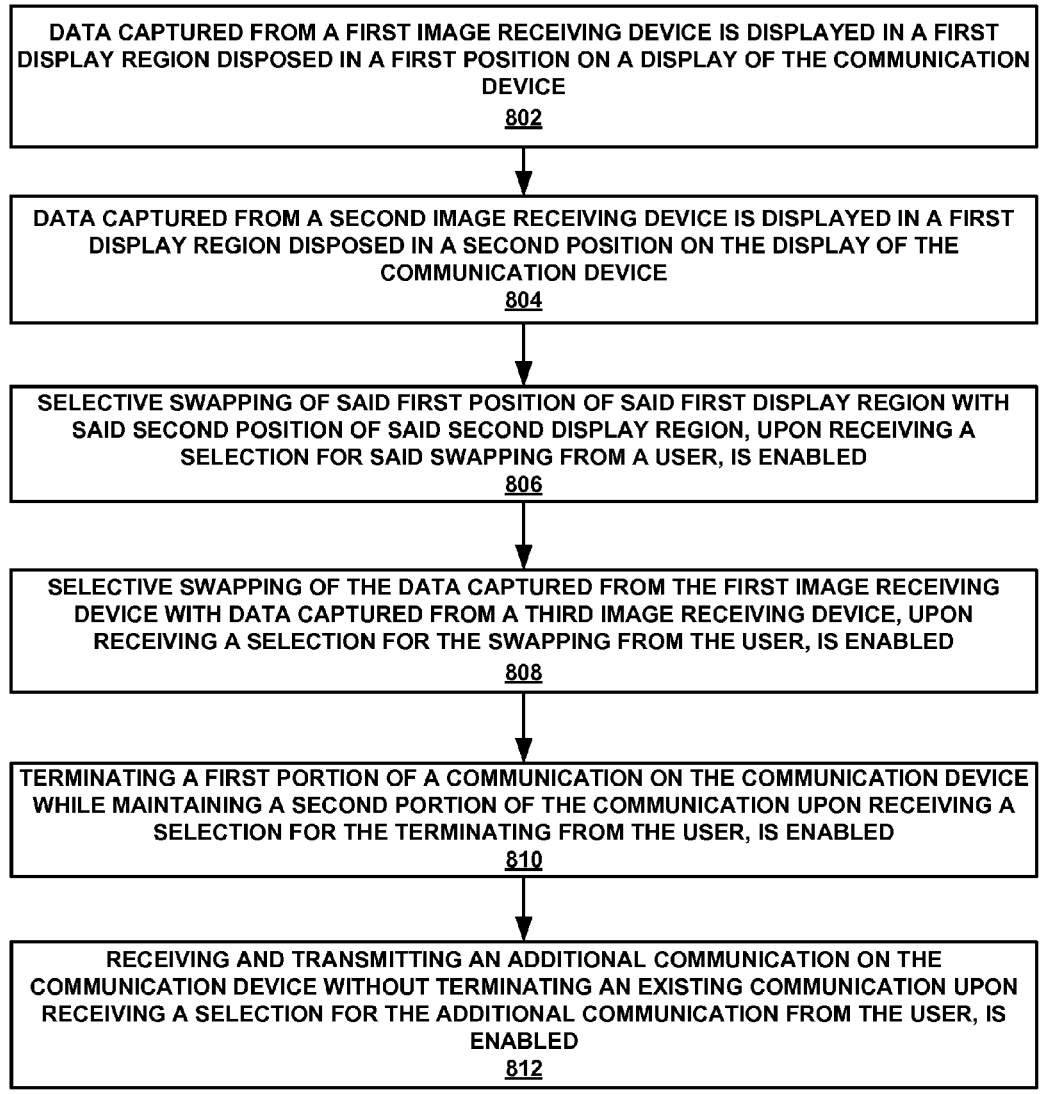
FIG. 8 illustrates a flowchart of an example method for manipulating images on a display of a communication device in accordance with embodiments of the present technology.

FIG. 8 is a flowchart illustrating process 800 for communicating with a user device, in accordance with one embodiment of the present invention. In one embodiment, process 800 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In various embodiments, process 800 may be performed by the devices and components depicted in FIGS. 1, 3, 5, 6 and 7. In one embodiment, the methods may reside in a computer usable storage medium having instructions embodied therein that when executed cause a computer system to perform the method.

At 802, data captured from a first image receiving device is displayed in a first display region disposed in a first position on a display of the communication device. For example, the first image receiving device may be a camera associated with the communication device which may be a smart phone and the data captured and displayed is a video.

At 804, data captured from a second image receiving device is displayed in a first display region disposed in a second position on the display of the communication device. For example, the second image receiving device may be a camera not associated with the communication device which may be a smart phone and the data captured and displayed is a video.

At 806, selective swapping of said first position of said first display region with said second position of said second display region, upon receiving a selection for said swapping from a user, is enabled. This feature may be useful if a user is transmitting a video while simultaneously receiving a video. The user may be more concerned with what the image being transmitted looks like and may therefore desire to have the image being transmitted displayed as the larger image.

At 808, selective swapping of the data captured from the first image receiving device with data captured from a third image receiving device, upon receiving a selection for the swapping from the user, is enabled. In one embodiment, this feature allows a device to either display two sets of data both captured with image receiving devices associated with the communication device or display data from two image receiving devices not associated with the communication device. In one embodiment, this feature allows a communication device to terminate data being captured and displayed by an image receiving device with another image receiving device.

At 810, terminating a first portion of a communication on the communication device while maintaining a second portion of the communication upon receiving a selection for the terminating from the user, is enabled.

At 812, receiving and transmitting an additional communication on the communication device without terminating an existing communication upon receiving a selection for the additional communication from the user, is enabled.

Figure 9:
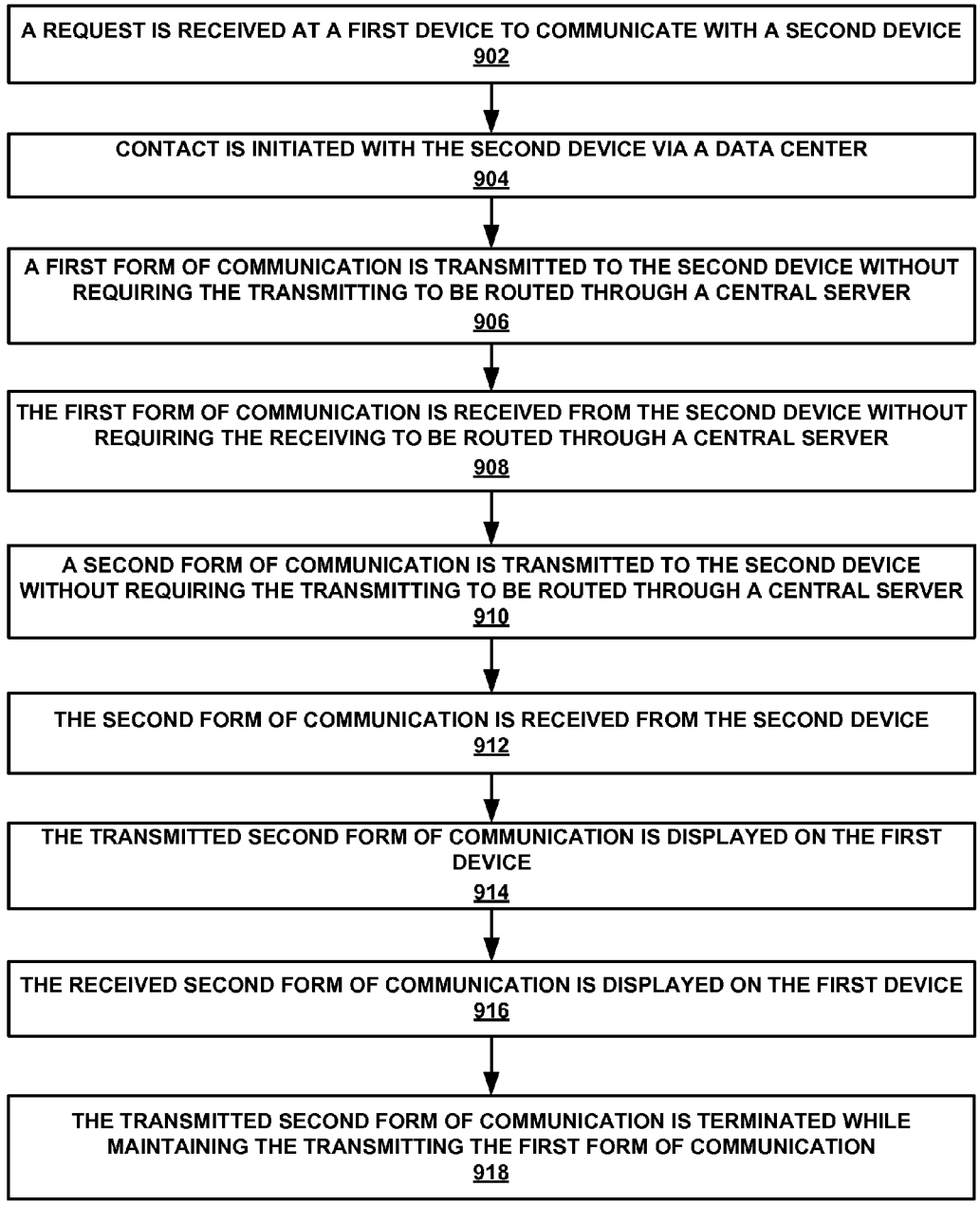
FIG. 9 illustrates a flowchart of an example method for communicating in accordance with embodiments of the present technology.

FIG. 9 is a flowchart illustrating process 900 for communicating, in accordance with one embodiment of the present invention. In one embodiment, process 900 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In various embodiments, process 900 may be performed by the devices and components depicted in FIGS. 1, 3, 5, 6 and 7. In one embodiment, the methods may reside in a computer usable storage medium having instructions embodied therein that when executed cause a computer system to perform the method.

At 902, a request is received at a first device to communicate with a second device.

At 904, contact is initiated with the second device via a data center.

At 906, a first form of communication is transmitted to the second device without requiring the transmitting to be routed through a central server.

At 908, the first form of communication is received from the second device without requiring the receiving to be routed through a central server.

At 910, a second form of communication is transmitted to the second device without requiring the transmitting to be routed through a central server.

At 912, the second form of communication is received from the second device.

At 914, the transmitted second form of communication is displayed on the first device.

At 916, the received second form of communication is displayed on the first device.

At 918, the transmitted second form of communication is terminated while maintaining the transmitted first form of communication.

FIG. 10 is a flowchart illustrating process 1000 for automatic contact filtering, in accordance with one embodiment of the present invention. In one embodiment, process 1000 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In various embodiments, process 1000 may be performed by the devices and components depicted in FIGS. 1, 3, 5, 6 and 7. In one embodiment, the methods may reside in a computer usable storage medium having instructions embodied therein that when executed cause a computer system to perform the method.

At 1002, data associated with a contact list is received at a computer system from a handheld device, wherein the data was sent automatically from the handheld device without requiring actions from a user. In one embodiment, an application in accordance with the present technology is installed on a device. The application may access a contact list or address book associated with the device. The contact list may have information regarding names, phone numbers, email addresses, etc. This data is then sent to a computer system. For example the computer system could be data center 605 of FIG. 6. The data may be sent automatically without require a user to request or send the data manually. In one embodiment, the application will seek and receive permission from the user before accessing the contact list.

At 1004, the data associated with the contact list is normalized using an algorithm. In one embodiment, this takes place in a computer system. The normalizing may include reorganizing the data associated with the contact list such that it can be easily compared to other contact data. For example, a contact list may have phone numbers that include local phone numbers and international phone number that include a prefix. The normalizing can identify items such as area codes and international prefixes and then properly classify or organize this data to be compared with other data.

At 1006, the normalized data is compared with data in a database. The other data in the database may be information regarding other devices that also have installed an application in accordance with embodiments of the present technology.

At 1008, contact matches are established between the data associated with the contact list and contacts in the database. It should be appreciated that the present technology is not limited to a database and may also use some other type of electronic records. For example, a first user may install the application on a first device at which point the name of the user and phone number for the device are sent to the database. Then a second user may input the name and phone number of the first user in a second device. Once the second user installs the application, the contact data regarding the first user, which is stored in the second device, is normalized and compared with the data base. A match to the first user will be found. Then, at 1010, the matches are reported to the handheld device. Thus the second user will be able to contact the first user via the installed application and the components of the device.

FIG. 11 is a flowchart illustrating process 1100 for communicating, in accordance with one embodiment of the present invention. In one embodiment, process 1100 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In various embodiments, process 1100 may be performed by the devices and components depicted in FIGS. 1, 3, 5, 6 and 7. In one embodiment, the methods may reside in a computer usable storage medium having instructions embodied therein that when executed cause a computer system to perform the method.

At 1102, a tracker peer is contacted and obtaining a list of peer nodes at a user device.

At 1104, a subset of peer nodes are selected from the list of peer nodes to act as relay nodes for a communication.

At 1106, a first form of communication is transmitted to at least one relay node for the at least one relay node to forward to at least one other user device, wherein the relay node is one of the subset of the peer nodes.

At 1108, the first form of communication is received at the user device from the at least one relay node forwarded from the at least one other user.

At 1110, a second form of communication is transmitted to the at least one relay node for the at least one relay node to forward to the at least one other user device, wherein the relay node is one of the subset of the peer nodes.

It should be appreciated that processes 800, 900, 1000, and 1100 need not carry out each of the described steps to complete its operation. Nor do the steps need to be carried out in the order described.

FIG. 14 is a flowchart illustrating process 1400 for performing multiple functions by a first mobile device during a video conference within a mobile device environment, in accordance with embodiments. In one embodiment, process 1400 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In various embodiments, process 1400 may be performed by the devices and components depicted in FIGS. 1, 3, 5, 6 and 7, 12A, 12B, and 13. In one embodiment, the methods may reside in a computer usable storage medium having instructions embodied therein that when executed cause a computer system to perform the method.

At operation 1402, a second function is performed at a first mobile device while a first function is being performed at the first mobile device without interruption of the first function, wherein the first function is a video conference between a first entity associated with the first mobile device and a second entity associated with a second mobile device, and wherein the first function and the second function are different functions. In various embodiments, the performing the second function includes: communicating text messages between the first mobile device and at least one other mobile device; communicating video gaming information between the first mobile device and at least one other mobile device; accessing a memory at the first mobile device and displaying, on a display screen at the first mobile device, data stored at the memory; taking a picture; and accessing a memory at the first mobile device and sending data from the memory to at least one other mobile device.

At operation 1404, in one embodiment, an object is displayed on a display screen of the first mobile device, wherein the object represents the second entity.

At operation 1406, in one embodiment and in addition to the step at operation 1404, a modification gesture is received, and in response to the receiving the modification gesture, a size of an image displayed on the display screen is modified from a first size to a second size, wherein subsequent to the modifying, the object includes the image at the second size. In one embodiment, the second size is smaller than the first size. In another embodiment, the receiving the modification gesture at operation 1406 includes receiving a pinching gesture. In one embodiment, the image displayed on the display screen is a representation of an activity open on the first mobile device for engagement with the first entity. In various embodiments, the activity includes any of the following: a video game; text messaging; and listening to music.

At operation 1408, in one embodiment, and in addition to the step described at operation 1404, object movement instructions are received and in response to receiving the object movement instructions, the object is moved from a first position on the display screen to a second position on the display screen.

Various embodiments are thus described. While particular embodiments have been described, it should be appreciated that the embodiments should not be construed as limited by such description, but rather construed according to the following claims.

What we claim is:

1. A non-transitory computer-readable storage medium comprising instructions stored thereon which, when executed by a computer system, cause said computer system to perform a method for enabling multiple functions to be performed by a first mobile device during a video conference within a mobile device environment, said method comprising:
    performing a second function at a first mobile device while a first function is being performed at said first mobile device without interruption of said first function, wherein said first function is a video conference between a first entity associated with said first mobile device and a second entity associated with a second mobile device, and wherein said first function and said second function are different functions, wherein said performing said second function comprises:
    communicating video gaming information between said first mobile device and at least one other mobile device.

2. The method of claim 1, wherein said performing said second function comprises:
    communicating text messages between said first mobile device and at least one other mobile device.

3. The method of claim 1, wherein said performing said second function comprises:
    accessing a memory at said first mobile device; and
    displaying, on a display screen at said first mobile device, data stored at said memory.

4. The method of claim 1, wherein said performing said second function comprises:
    taking a picture.

5. The method of claim 1, wherein said performing said second function comprises:

accessing a memory at said first mobile device; and
sending data from said memory to at least one other mobile device.

6. The method of claim 1, further comprising:
displaying an object on a display screen of said first mobile device, wherein said object represents said second entity.

7. The method of claim 6, further comprising:
receiving a modification gesture; and
in response to said receiving said modification gesture, modifying a size of an image displayed on said display screen from a first size to a second size, wherein subsequent to said modifying, said object comprises said image at said second size.

8. The method of claim 7, wherein said second size is smaller than said first size.

9. The method of claim 7, wherein said receiving said modification gesture comprises:
receiving a pinching gesture.

10. The method of claim 7, wherein said image displayed on said display screen is a representation of an activity open on said first mobile device for engagement with said first entity.

11. The method of claim 10, wherein said activity comprises a video game.

12. The method of claim 10, wherein said activity comprises text messaging.

13. The method of claim 10, wherein said activity comprises listening to music.

14. The method of claim 10, wherein said activity comprises emailing.

15. The method of claim 7, further comprising:
receiving object movement instructions; and
and in response to said object movement instructions, moving said object from a first position on said display screen to a second position on said display screen.

16. A system for enabling multiple functions to be performed by a first mobile device during a video conference within a mobile device environment, said system comprising:
a first mobile device configured for communication via video conference with at least one other mobile device; wherein said first mobile device comprises:
a first function performance module coupled with a computer of said first mobile device, said first function performance module configured for performing a first function, wherein said first function comprises participation in said video conference between a first entity associated with said first mobile device and a second entity associated with a second mobile device of said at least one other mobile device; and
a second function performance module coupled with said computer, said second function performance module configured for performing a second function at said first mobile device while said first function is being performed at said first mobile device without interruption of said first function, wherein said first function and said second function are different functions, wherein said second function comprises communicating video gaming information between said first mobile device and said at least one other mobile device.

17. The system of claim 16, wherein said first mobile device further comprises:
an object displayer coupled with said computer, said object displayer configured for displaying an object on a display screen of said first mobile device, wherein said object represents said second entity.

18. The system of claim 17, wherein said object displayer comprises:
a modification gesture receiver coupled with said computer, said modification gesture receiver configured for receiving a modification gesture; and
an image modifier coupled with said computer, said image modifier configured for, in response to said receiving said modification gesture, modifying a size of an image displayed on said display screen from a first size to a second size, wherein subsequent to said modifying, said object comprises said image at said second size.

19. The system of claim 18, wherein said object displayer further comprises:
an object movement instruction receiver coupled with said computer, said object movement instruction receiver configured for receiving object movement instructions; and
an object mover coupled with said computer, said object mover configured for, in response to said object movement instructions, moving said object from a first position on said display screen to a second position on said display screen.

* * * * *